US012680354B2

(12) United States Patent
Reger

(10) Patent No.: US 12,680,354 B2
(45) Date of Patent: Jul. 14, 2026

(54) PORTABLE DOOR LOCKING DEVICE

(71) Applicant: FLIP LOK LLC, Houston, TX (US)

(72) Inventor: John Reger, Houston, TX (US)

(73) Assignee: FLIP LOK LLC

( * ) Notice: Subject to any disclaimer, the term of this patent is extended or adjusted under 35 U.S.C. 154(b) by 0 days.

(21) Appl. No.: 18/508,138

(22) Filed: Nov. 13, 2023

(65) Prior Publication Data

US 2024/0159088 A1 May 16, 2024

Related U.S. Application Data

(60) Provisional application No. 63/383,253, filed on Nov. 10, 2022.

(51) Int. Cl.
*E05C 19/08* (2006.01)

(52) U.S. Cl.
CPC .................................... *E05C 19/08* (2013.01)

(58) Field of Classification Search
CPC ...... E05C 19/08; E05C 19/184; E05C 19/003; E05C 19/082; E05C 19/188; Y10T 292/323; Y10T 292/31; Y10T 292/314; Y10T 292/34; Y10T 292/37; Y10T 292/373; Y10T 292/379; Y10T 292/394; Y10T 292/397; Y10T 292/1062; Y10T 292/1063; Y10S 292/17
See application file for complete search history.

(56) References Cited

U.S. PATENT DOCUMENTS

| | | | | | |
|---|---|---|---|---|---|
| 267,035 | A | * | 11/1882 | Streeter | E05C 19/182<br>292/298 |
| 893,463 | A | * | 7/1908 | Denny et al. | E05C 19/182<br>292/297 |
| 1,659,822 | A | * | 2/1928 | Innes | E05F 11/00<br>292/145 |
| 1,733,460 | A | * | 10/1929 | Kindel | F16B 12/60<br>5/299 |
| 1,764,367 | A | * | 6/1930 | Szymanski | E05B 67/36<br>70/403 |

(Continued)

FOREIGN PATENT DOCUMENTS

| | | | | | |
|---|---|---|---|---|---|
| CN | 107762315 | A | * | 3/2018 | E05C 19/08 |
| GB | 511988 | A | * | 8/1939 | E05C 17/166 |

(Continued)

*Primary Examiner* — Steven A Tullia

(57) ABSTRACT

A door security device for an out-swing door includes a mounting plate secured to the door, a hinge pin assembly supported by the mounting plate proximate the door outside edge, a clasp swing plate secured to the hinge pin assembly for pivotal movement between unlocked and locked positions, a door frame anchor bolt received in a clasp cut-out of the clasp swing plate captured behind an enlarged anchor bolt head in the locked position in a lowermost position of the clasp swing plate, the clasp swing plate biased by force of gravity to the lowermost position, and the mounting plate having a first receiver top surface at the hinge pin vertical axis, the first receiver top surface defining the uppermost position of the clasp swing plate in an unlocked position parallel to the mounting plate and defining the lowermost position of the clasp swing plate in the unlocked position perpendicular to the mounting plate.

8 Claims, 40 Drawing Sheets

(56) References Cited

U.S. PATENT DOCUMENTS

| | | | | | |
|---|---|---|---|---|---|
| 2,490,018 | A * | 12/1949 | Davis | E05D 15/00 | 292/342 |
| 2,794,665 | A * | 6/1957 | Sasse | E05C 19/18 | 16/351 |
| 3,431,591 | A * | 3/1969 | Betso | E05D 7/105 | 16/265 |
| 3,805,325 | A * | 4/1974 | Lee | E05D 5/12 | 16/223 |
| 3,810,667 | A * | 5/1974 | Dugan | E05C 3/048 | 292/297 |
| 3,811,150 | A * | 5/1974 | Chalmers | E05D 11/1007 | 16/389 |
| 3,822,440 | A * | 7/1974 | Stansbury, Jr. | E05D 11/1014 | 16/303 |
| 3,969,788 | A * | 7/1976 | McCullough | E05D 11/1007 | 16/326 |
| 4,015,868 | A * | 4/1977 | Buttler | E05C 19/184 | 292/302 |
| 4,340,992 | A * | 7/1982 | Lombardi | E05D 11/1007 | 16/349 |
| 4,408,789 | A * | 10/1983 | Miller | E05C 17/166 | 292/268 |
| 4,603,452 | A * | 8/1986 | Paciorek | E05D 7/10 | 16/386 |
| 4,627,651 | A * | 12/1986 | Grimbly | E05C 19/184 | 292/341.15 |
| 4,844,519 | A * | 7/1989 | Dagon | E05C 19/184 | 292/57 |
| 5,407,240 | A * | 4/1995 | Andre | E05B 65/08 | 292/DIG. 46 |
| 5,590,922 | A * | 1/1997 | Hucknall | E05C 3/048 | 292/202 |
| 5,732,986 | A * | 3/1998 | Piva | E05B 17/2038 | 292/DIG. 17 |
| 6,151,757 | A * | 11/2000 | Beals, Jr. | E05D 7/009 | 16/388 |
| 6,317,928 | B1 * | 11/2001 | Guillemette | E05D 7/1016 | 16/380 |
| 6,343,818 | B1 * | 2/2002 | Kuramochi | E05C 17/166 | 49/386 |
| 6,416,089 | B1 * | 7/2002 | Williams, Jr. | E05C 19/182 | 292/288 |
| 6,520,405 | B1 * | 2/2003 | Braxter | E05C 19/08 | 70/2 |
| 6,735,989 | B1 * | 5/2004 | Schramm | E05B 67/383 | 70/164 |
| 8,136,852 | B1 * | 3/2012 | Thomas | E05C 3/044 | 292/288 |
| 8,469,410 | B2 * | 6/2013 | Wood | E05C 7/00 | 292/288 |
| 10,501,964 | B2 * | 12/2019 | Kashani | E05C 5/00 | |
| 10,590,687 | B1 * | 3/2020 | Cifers | E05D 7/12 | |
| 11,434,674 | B2 * | 9/2022 | Goss | E05B 63/0004 | |
| 11,859,421 | B2 * | 1/2024 | Reger | E05C 19/003 | |
| 12,018,519 | B2 * | 6/2024 | Salcido | E05C 19/184 | |
| 12,252,913 | B2 * | 3/2025 | Zeppetelli | E05C 17/54 | |
| 12,264,519 | B2 * | 4/2025 | Hodge | E05B 67/06 | |
| 2009/0058104 | A1 * | 3/2009 | Huang | E05C 17/00 | 292/288 |
| 2011/0156409 | A1 * | 6/2011 | Alvarenga | E05C 19/184 | 292/175 |
| 2014/0117681 | A1 * | 5/2014 | Jenkins | E05C 19/188 | 292/256.71 |
| 2019/0301214 | A1 * | 10/2019 | Wahba | E05B 17/2003 | |
| 2020/0149328 | A1 * | 5/2020 | Cohen | E05C 3/167 | |
| 2024/0125156 | A1 * | 4/2024 | Guest | E05C 1/06 | |

FOREIGN PATENT DOCUMENTS

| | | | | |
|---|---|---|---|---|
| GB | 2098271 | A * | 11/1982 | E05C 3/048 |
| GB | 2184773 | A * | 7/1987 | E05C 19/08 |
| KR | 20110000347 | U * | 1/2011 | E05C 19/08 |
| KR | 101404581 | B1 * | 6/2014 | E05C 19/08 |
| WO | WO-2013058647 | A1 * | 4/2013 | E05B 65/48 |

* cited by examiner

FIG. 47b
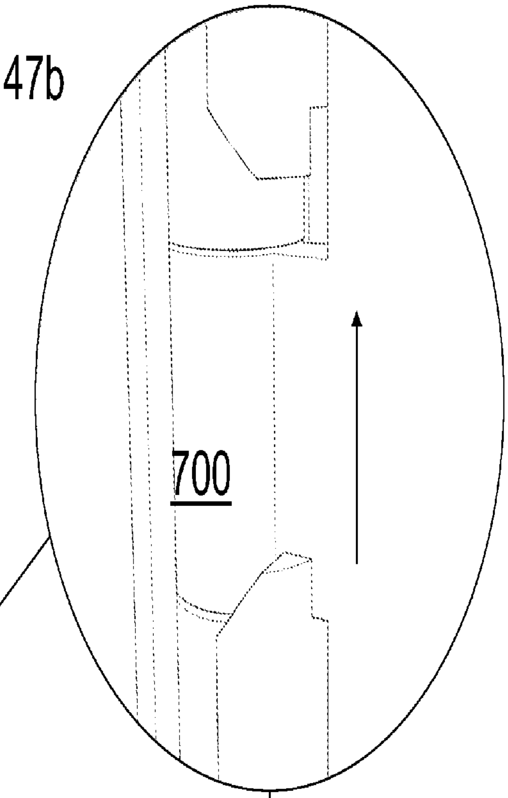
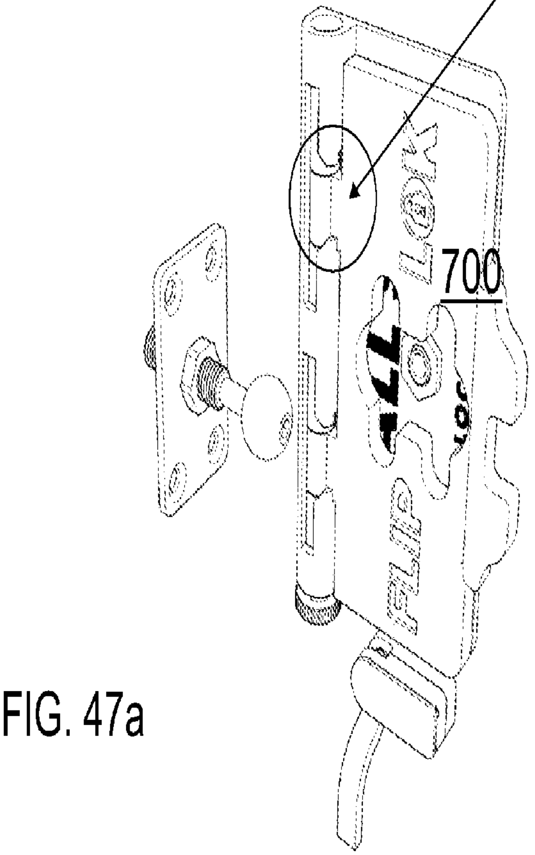
FIG. 47a
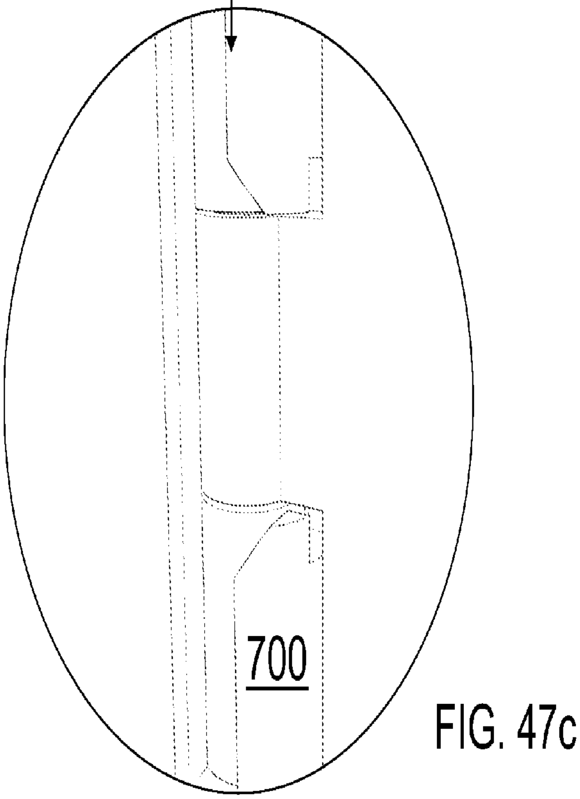
FIG. 47c

PORTABLE DOOR LOCKING DEVICE

CROSS-REFERENCE TO RELATED APPLICATIONS

This application is related to each of the following applications, each hereby being incorporated by reference in entirety: U.S. Provisional Patent Application No. 63/383,252 filed Nov. 10, 2022, titled PORTABLE DOOR LOCKING DEVICE; U.S. Provisional patent application Ser. No. 17/520,309 filed Nov. 5, 2021, and titled DOOR SECURITY DEVICE; U.S. Provisional patent application Ser. No. 17/532,418 filed Nov. 22, 2021, and titled DOOR SECURITY DEVICE, Ser. No. 17/881,025 filed Aug. 4, 2022, and titled DOOR SECURITY DEVICE; and U.S. Design patent application Ser. No. 29/856,566 filed Oct. 14, 2022, and titled PORTABLE DOOR LOCKING DEVICE.

FIELD OF THE INVENTION

The present disclosure relates to door mechanical security devices.

BACKGROUND OF THE INVENTION

Many commercial buildings include one-way, out-swing exterior doors. Most are constructed of steel, although other materials may be used. The out-swing operation of exterior doors often complies with building codes and best practices for fire safety. Out-swing doors are often equipped with a panic bar to provide ready egress during a fire or other emergency when people are in the building during regular business hours.

Exterior doors are normally locked outside business hours. Nonetheless, buildings with exterior doors mounted for out-swing operation are disproportionately attractive targets for burglars. This is because doors mounted to open in the out-swing direction, when locked, can often be forced open using a pry bar. Locked out-swing doors, even steel doors often can be pried open by wedging the pry bar or similar tool between the door and door frame.

The risk of substantial losses due to burglary when commercial buildings with out-swing exterior doors are locked outside business hours makes it desirable to install both an ordinary electronic security monitoring system in the building and supplemental mechanical security devices for the out-swing doors. Supplemental mechanical security devices may be attached to the door, door frame, or both.

For example, U.S. Pat. No. 4,856,831 to Roden Jr. discloses a security support bar that may be bolted to an out-swing door on the interior side, across the door frame, to prevent the door from being opened. This arrangement, however, requires the permanent installation of a large bar that defeats or interferes with a panic bar arrangement. U.S. Pat. No. 5,364,140 to Rice improves over Roden Jr. Rice's device includes a handle, a rod extending across the door, blocking members at the door frame, attachment hardware, and an actuating mechanism. Rice's device can be used 35 without interfering with the ordinary operation of the panic bar during an emergency. Rice's mechanism, however, is even larger than Roden Jr.'s security support bar.

In view of the preceding, a need exists for improved door security devices for out-swing doors.

BRIEF SUMMARY OF THE INVENTION

The above-mentioned shortcomings, disadvantages, and problems are addressed herein, as will be understood by those skilled in the art upon reading and studying the following specifications. This summary is provided to introduce a selection of concepts in simplified form that are further described below in more detail in the Detailed Description. This summary is not intended to identify key or essential features of the claimed subject matter.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

The present disclosure provides an improved door-locking device for securing an out-swing door against forced entry. Apparatus, systems, and methods of varying scope are described herein. These aspects are indicative of various non-limiting ways in which the disclosed subject matter may be utilized, all of which are intended to be within the scope of the disclosed subject matter. In addition to the aspects and advantages described in this summary, further aspects, features, and advantages will become apparent by reference to the associated drawings, detailed descriptions, and claims.

BRIEF DESCRIPTION OF THE DRAWINGS

The novel features believed characteristic of the disclosed subject matter will be set forth in any claims that are filed later. The disclosed subject matter itself, however, as well as a preferred mode of use, further objectives, and advantages thereof, will best be understood by reference to the following detailed description of an illustrative embodiment when read in conjunction with the accompanying drawings, wherein:

FIG. 47*a* is a perspective view similar to FIG. 43, with FIGS. 47*b* and 47*c* showing an enlarged area in detail.

DETAILED DESCRIPTION OF ILLUSTRATIVE EMBODIMENTS

Figure 1:
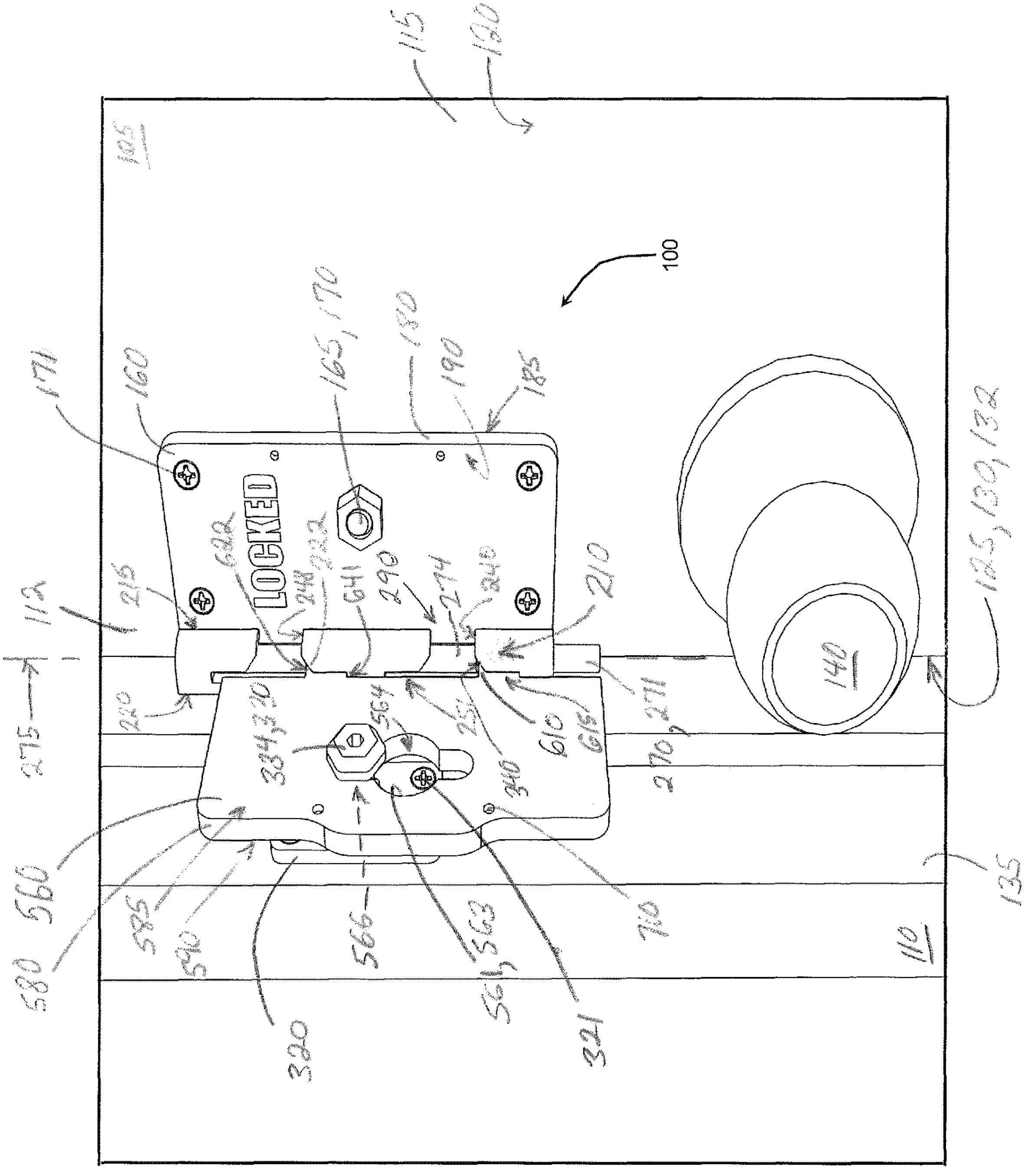
FIG. 1 is an enlarged partial perspective view showing a door locking device in locked position, in use with an out-swing door in an exemplary embodiment.

In this detailed description, reference is made to the accompanying drawings which form a part hereof, and in which is shown by way of illustration specific embodiments which may be practiced. Reference now should be made to the drawings, in which the same reference numbers are used throughout the different figures to designate the same components. These embodiments are described in sufficient detail to enable those skilled in the art to practice the embodiments and disclosure. It is to be understood that other embodiments may be utilized, and that logical, mechanical, electrical, and other changes may be made without departing from the scope of the embodiments and disclosure. In view of the foregoing, the following detailed description is not to be taken as limiting the scope of the embodiments or disclosure.

The terminology used herein is for the purpose of describing particular embodiments only and is not intended to be limiting. As used herein, the singular forms “a”, “an”, and “the” are intended to include the plural forms as well, unless the context clearly indicates otherwise. It will be further understood that the terms “comprises” and/or “comprising” or “includes” and/or “including” when used in this specification, specify the presence of stated features, regions, integers, steps, operations, elements, and/or components, but do not preclude the presence or addition of one or more other features, regions, integers, steps, operations, elements, components, and/or groups thereof.

It will be appreciated that for simplicity and clarity of illustration, where considered appropriate, reference numerals may be repeated among the figures to indicate corresponding or analogous elements. In addition, numerous specific details are set forth in order to provide a thorough understanding of the implementations described herein. However, it will be understood by those of ordinary skill in the art that the implementations described herein may be practiced without these specific details. In other instances, well-known methods, procedures and components have not been described in detail so as not to obscure the implementations described herein. Also, the description is not to be considered as limiting the scope of the implementations described herein.

The detailed description set forth herein in connection with the appended drawings is intended as a description of exemplary embodiments in which the presently disclosed apparatus and system can be practiced. The term “exemplary” used throughout this description means “serving as an example, instance, or illustration,” and should not necessarily be construed as preferred or advantageous over other embodiments.

Illustrated in FIG. 1 is a partial perspective view showing a door locking device 100 in locked position, in use with an out-swing door 105 in an exemplary embodiment. Door locking device 100 is adapted for securing the out-swing door 105 against forced entry. To aid in ready understanding of the scope and utility of the disclosed subject matter, the out-swing door 105 will be further described. The reference “*Parts of a Door Explained*” by Diffey, N. (Salisbury Joinery blog dated Nov. 7, 2017) viewed Nov. 2, 2021 at www.salisburyjoinery.com/blog/parts-of-a-door-explained, is incorporated by reference in entirety.

Figure 4:
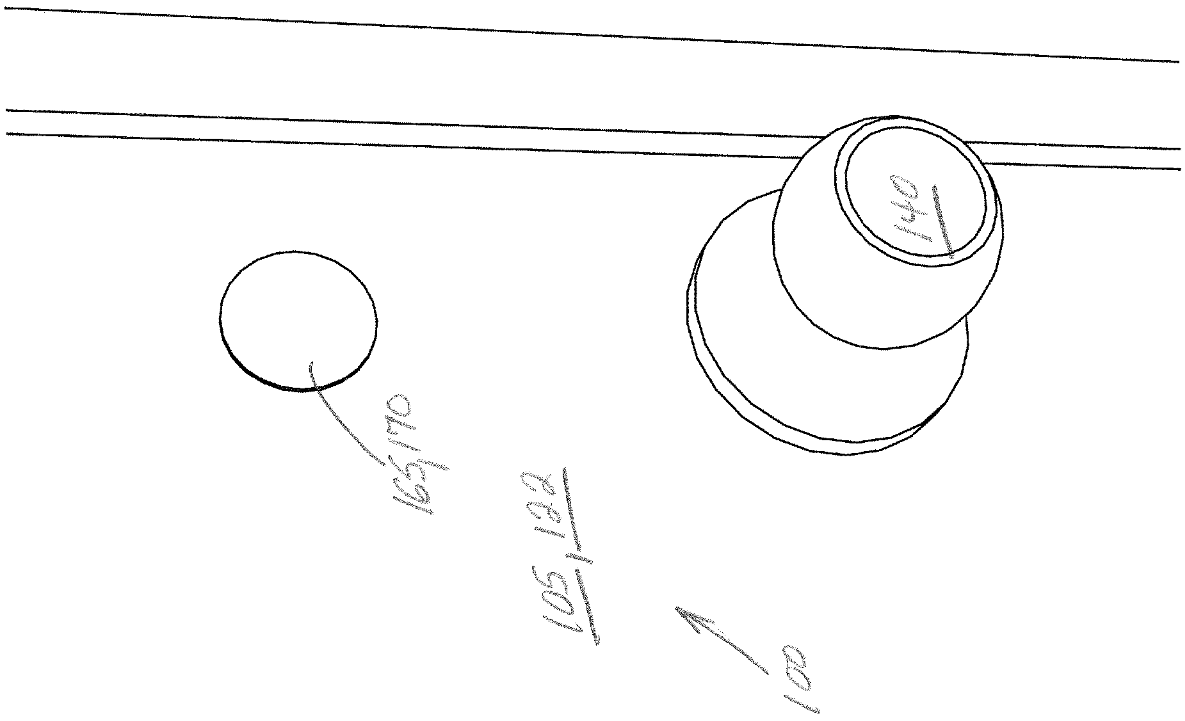
FIG. 4 is enlarged partial perspective view showing a door exterior surface having a door locking device mounted therein, in an exemplary embodiment.
Figure 5:
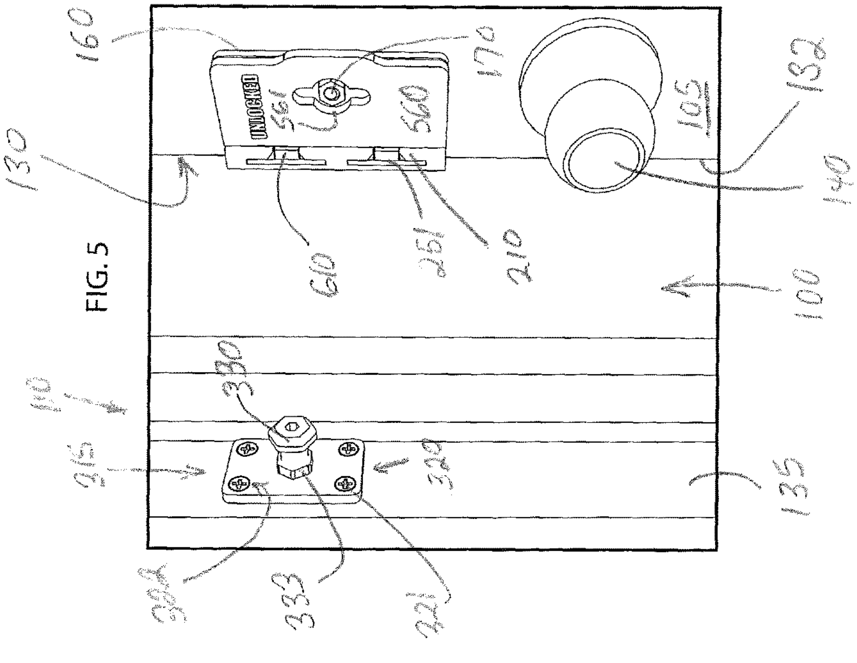
FIGS. 5-22 are perspective views showing the door locking device of FIG. 1 with clasp swing plate in various positions including unlocked uppermost, intermediate, and locked lowermost positions thereof.
Figure 6:
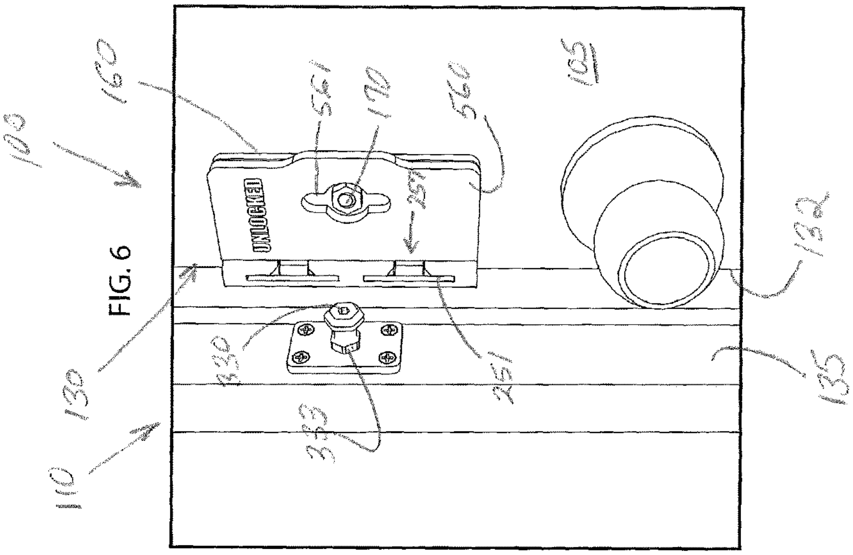
Figure 7:
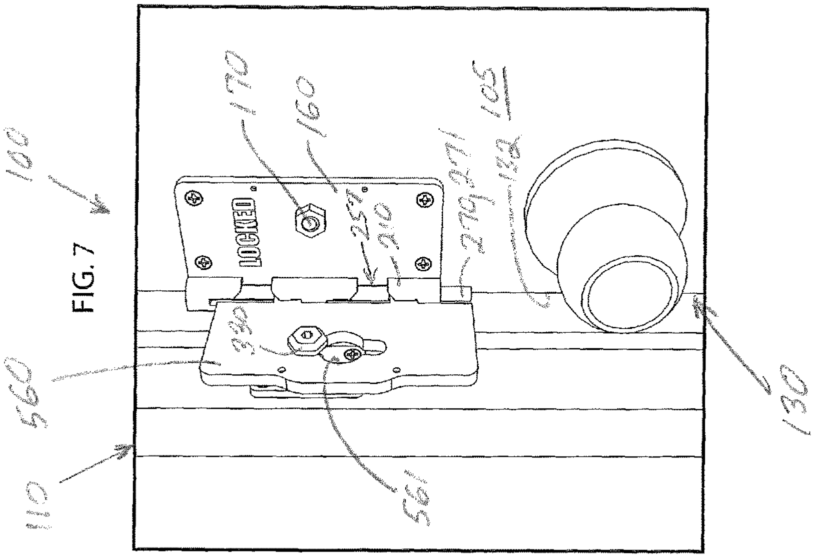

Out-swing door 105 (FIG. 1) may include a stile mounted to a set of door hinges supported by a door frame 110 (FIG. 1) for pivotal movement about a door hinge vertical axis, between a closed position abutting the door frame 110 and an open position pivoted away from the closed position. The closed position is shown in FIG. 1. The set of door hinges is mounted to the door frame 110 and door 105, for out-swing movement. Door 105 includes a stile extending parallel to the door hinge vertical axis from a bottom rail to a top rail thereof. The door 105 has a lock stile 112 (FIG. 1) opposite the stile. The door 105 has a door body 115 (FIG. 1) including a planar door interior surface 120 (FIG. 1) facing the door frame 110. Door 105 has a door exterior surface 122 (shown in FIG. 4) facing opposite the interior surface 120 (shown in FIG. 1). The door body 115 has a continuous door peripheral edge 125 extending from the interior surface 120 to the exterior surface in intersecting perpendicular relation thereto. The door peripheral edge 125 includes a door inside edge defined along the stile proximate the door hinge vertical axis. Door peripheral edge 125 includes a door outside edge 130 extending vertically and defined along the lock stile 112 in opposed parallel relation to the door inside edge. Door 105 includes a door handle 140 at the lock stile 112, which is operable for manual operation.

The door frame 110 includes an elongated first jamb extending in the vertical direction in corresponding relationship to the door inside edge, and in the closed position abutting the inside edge. Door frame 110 includes an elongated second jamb 135 extending in the vertical direction in corresponding relationship to the door outside edge 130, and in the closed position abutting the outside edge.

Figure 24:
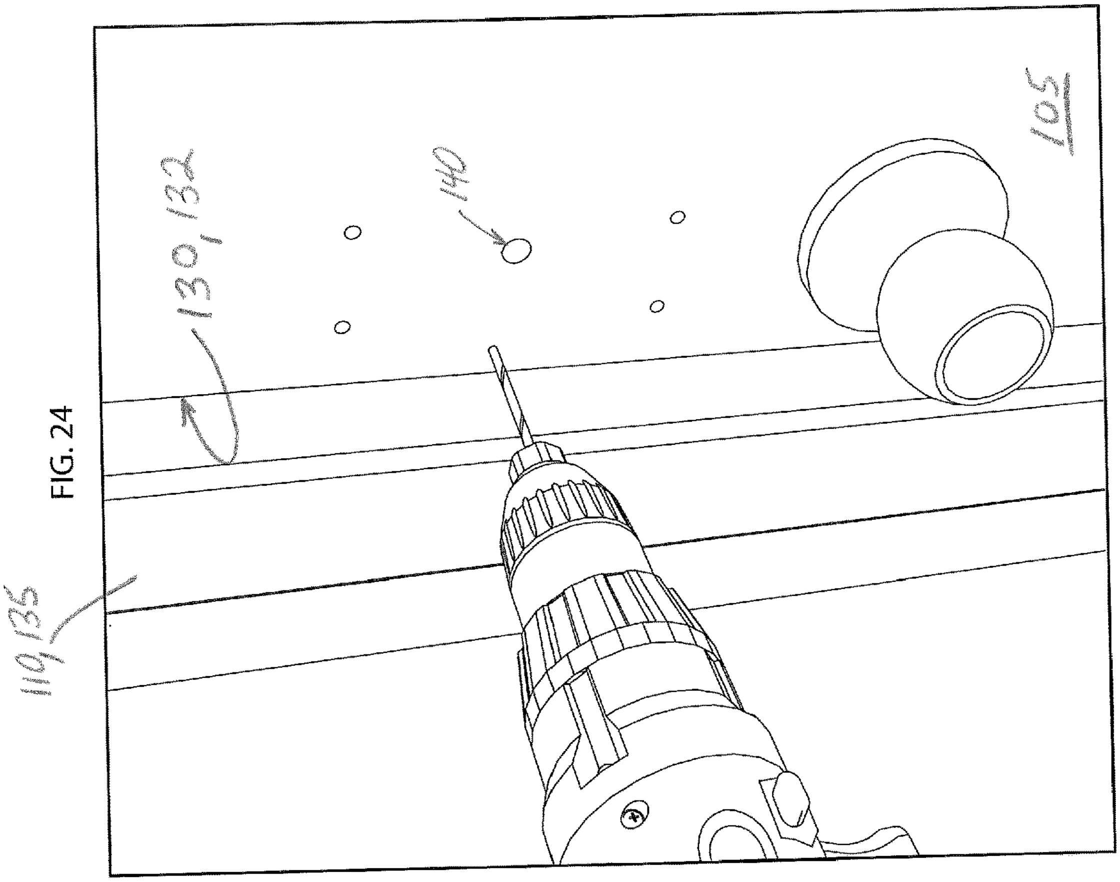
FIGS. 23-32 are perspective views showing aspects of installation of the door locking device of FIG. 1.
Figure 23:
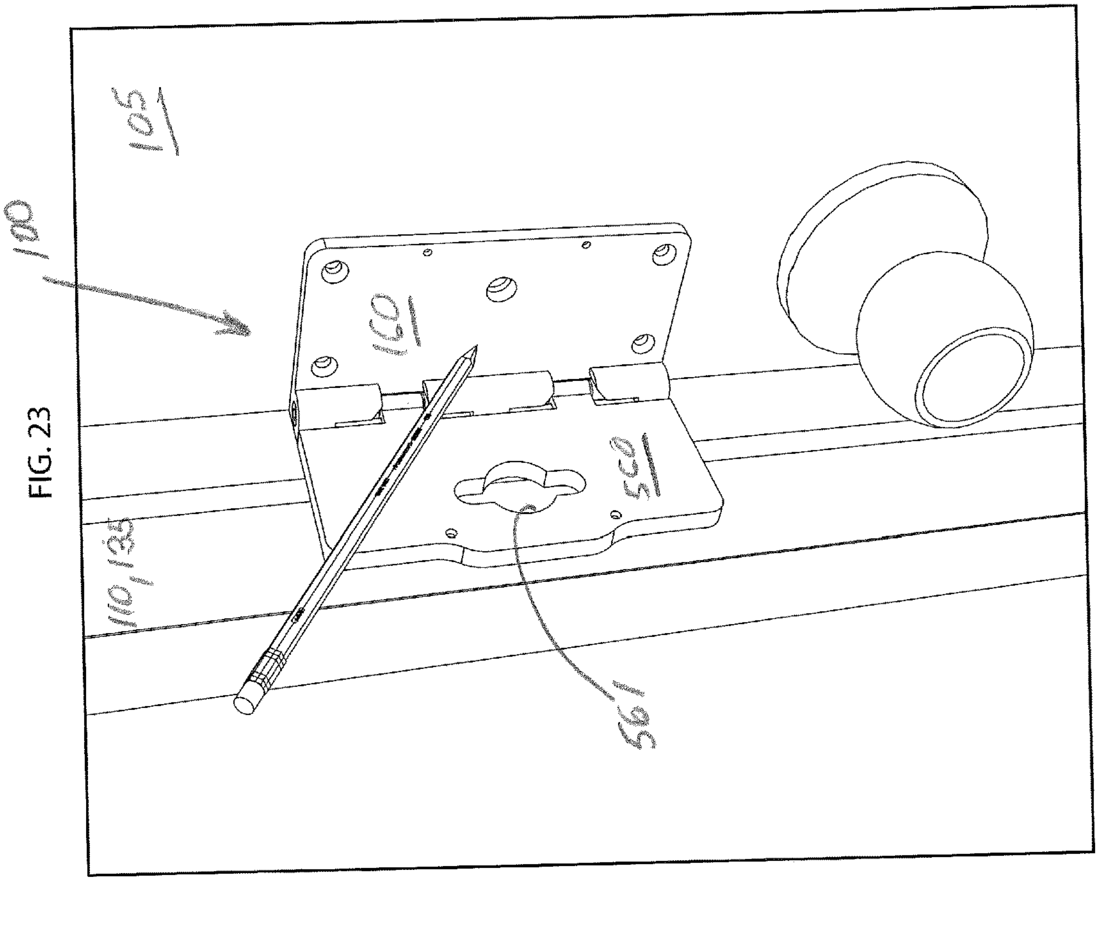
Figure 26:
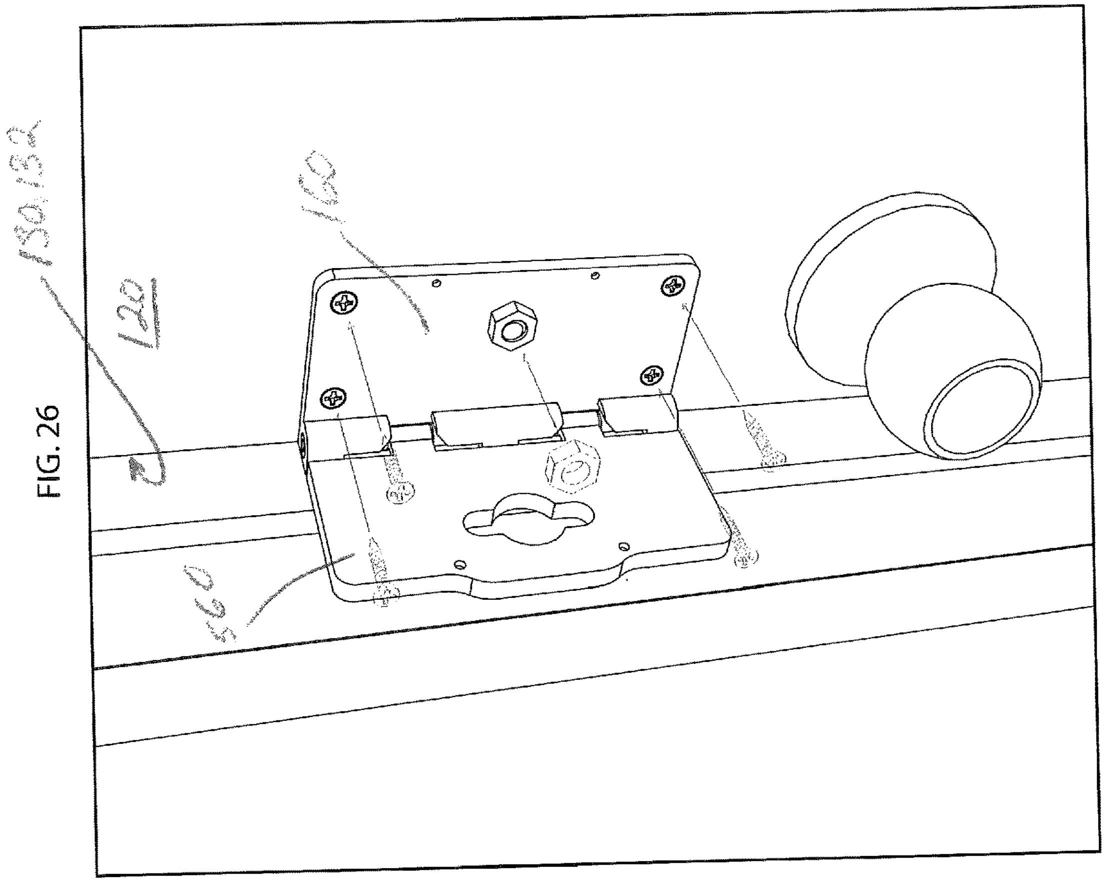
Figure 25:
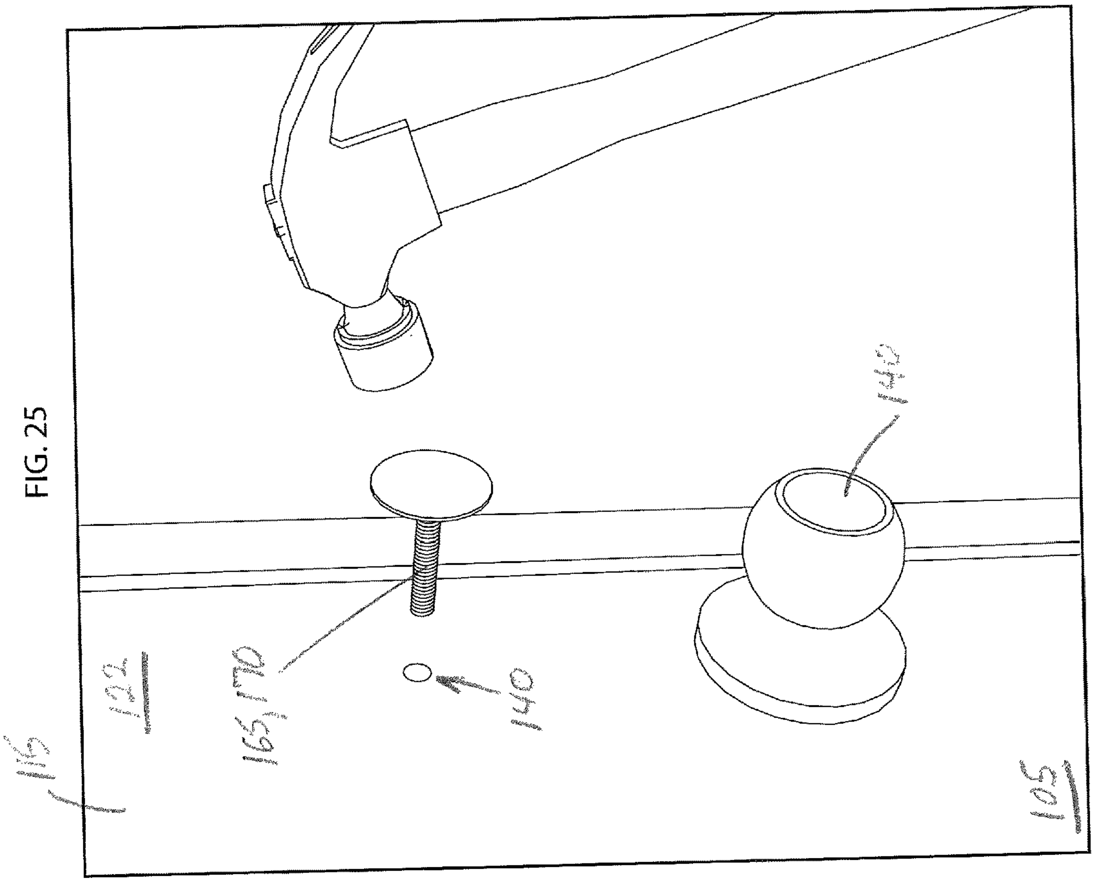
Figure 28:
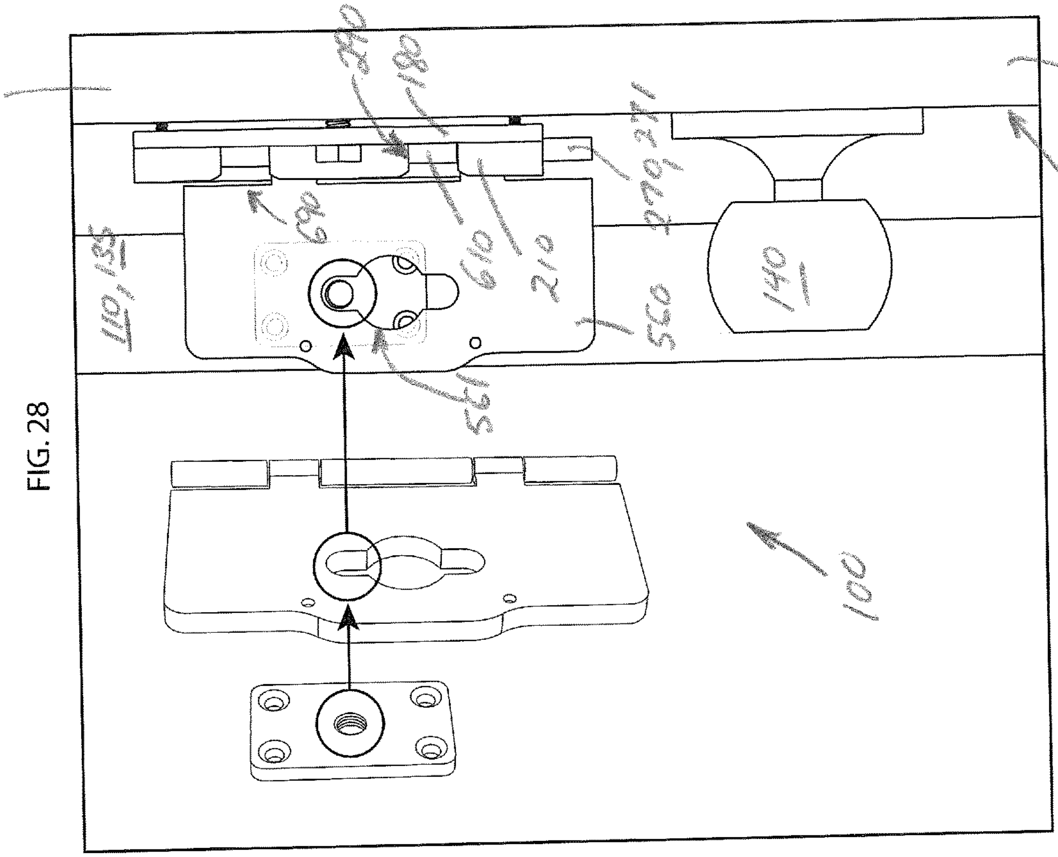
Figure 27:
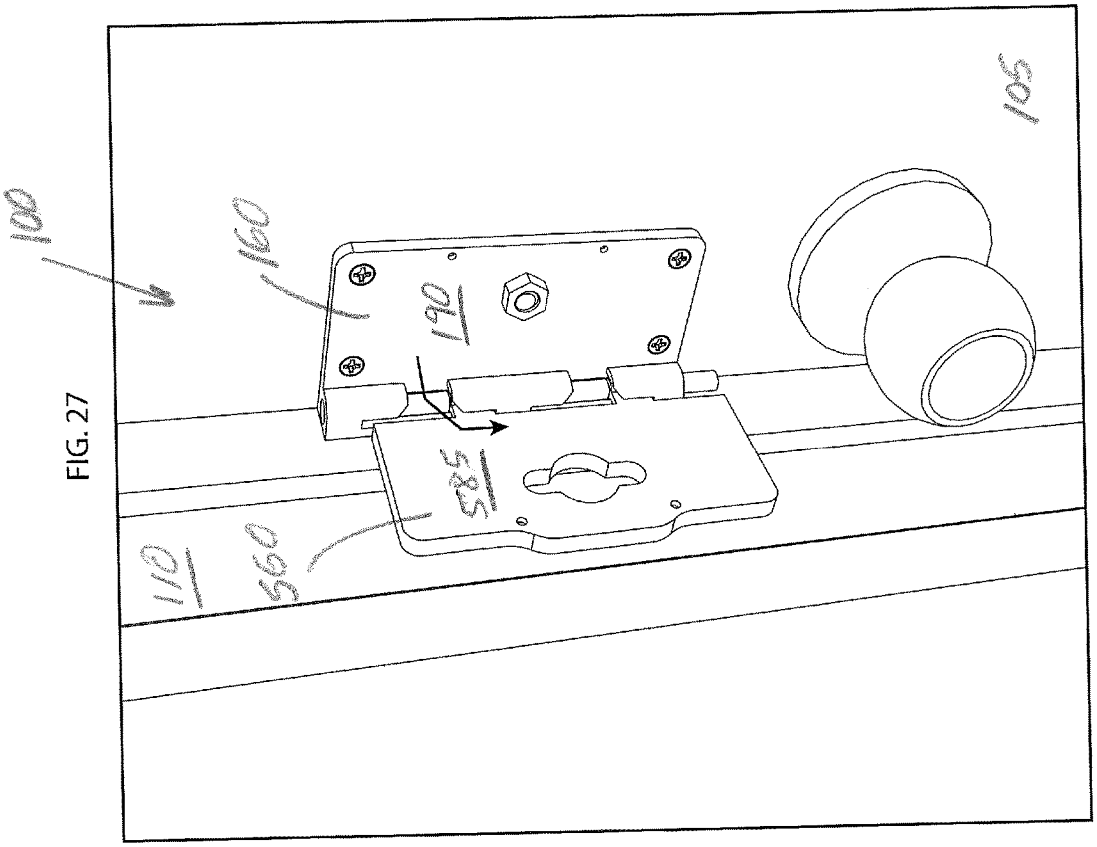
Figure 30:
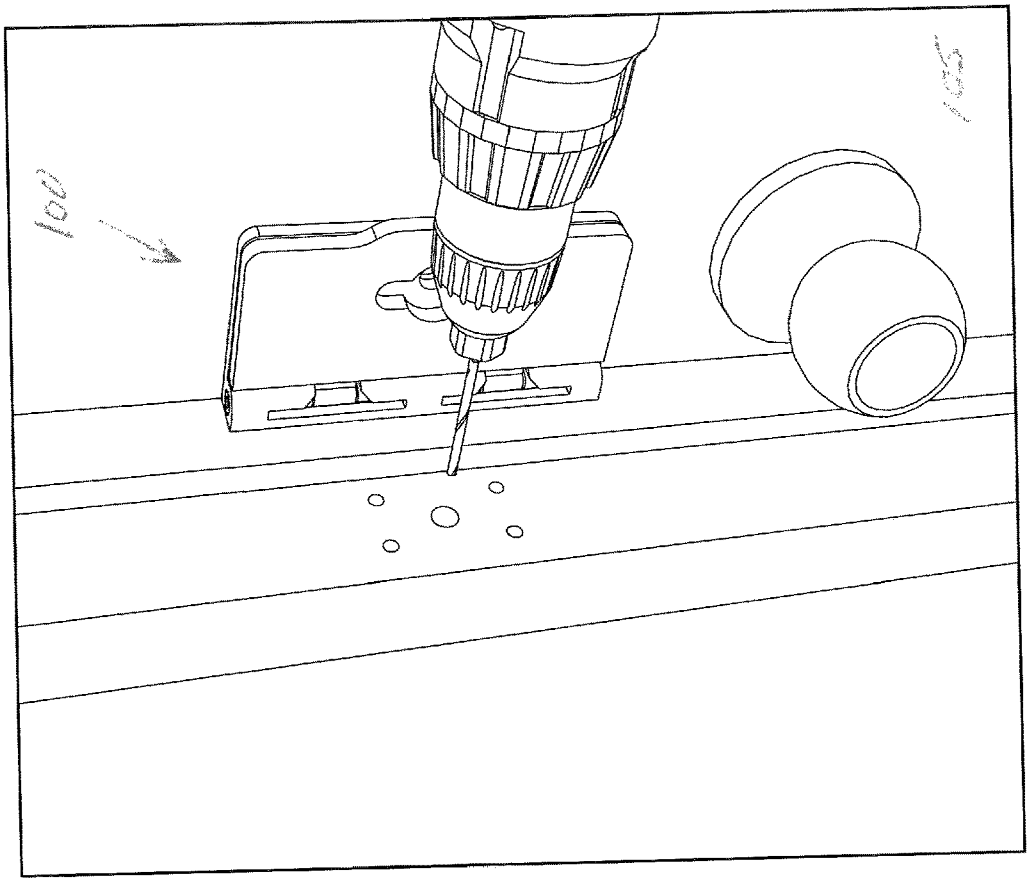
Figure 29:
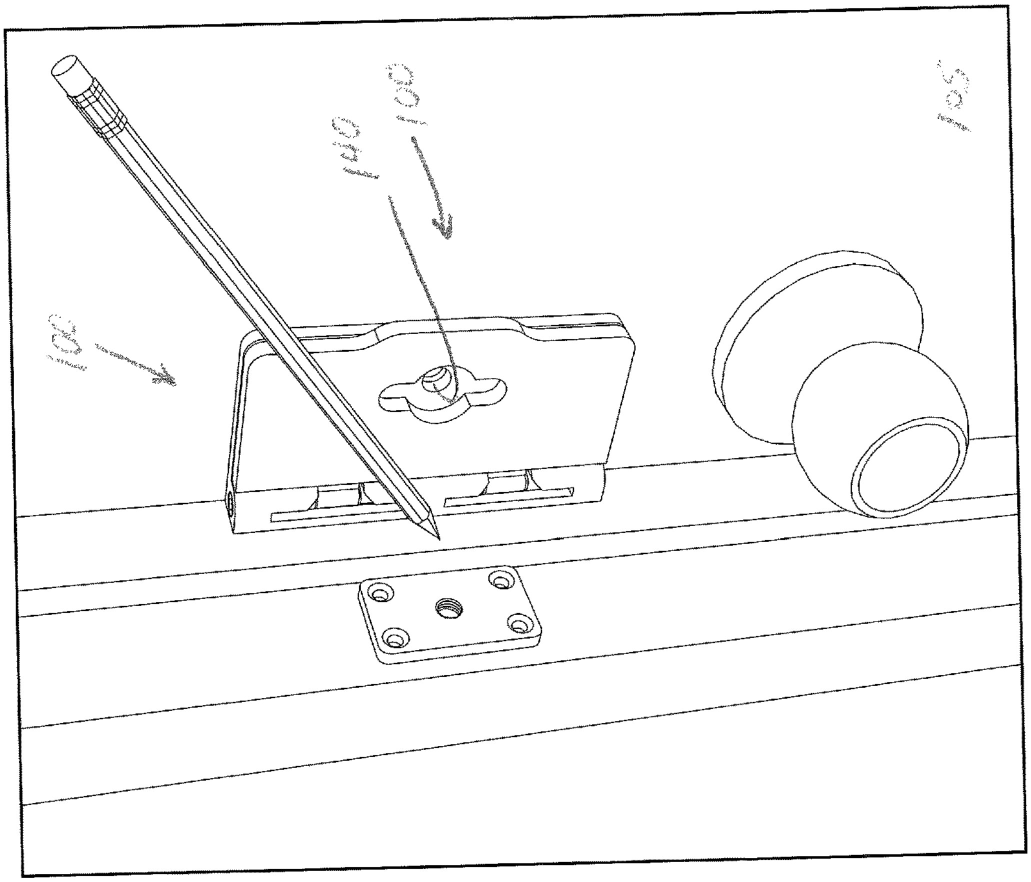
Figure 32:
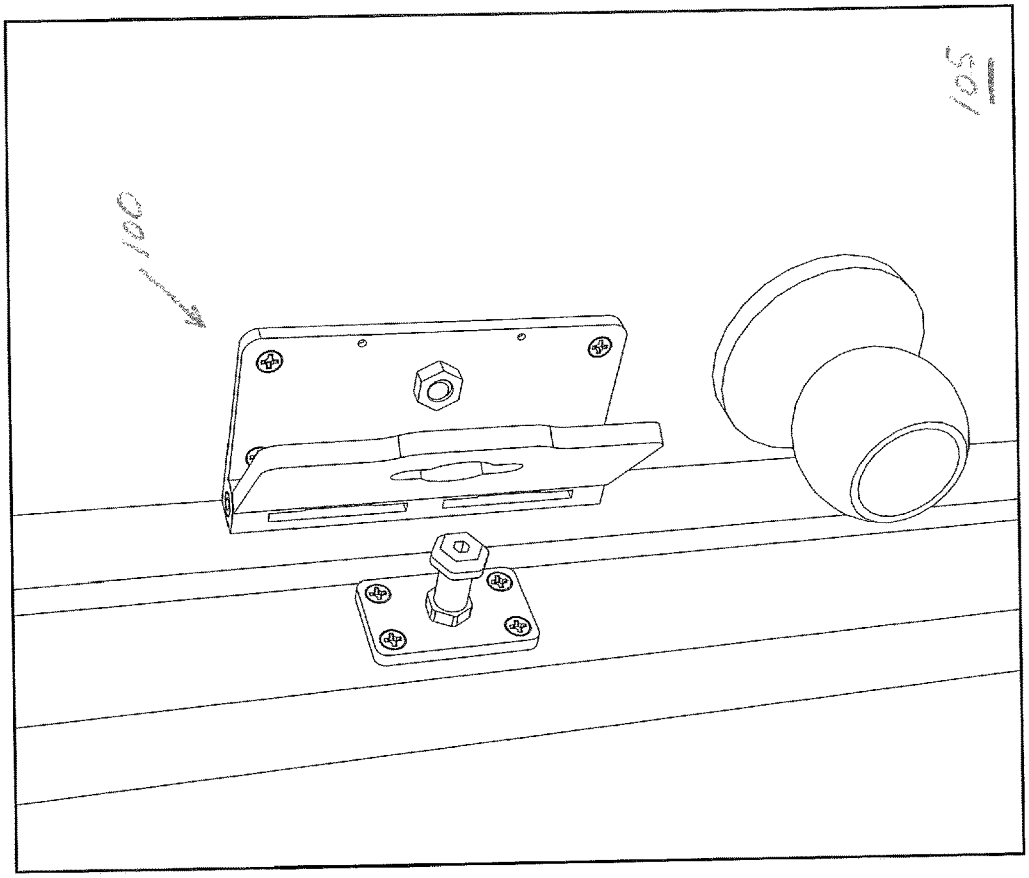
Figure 31:
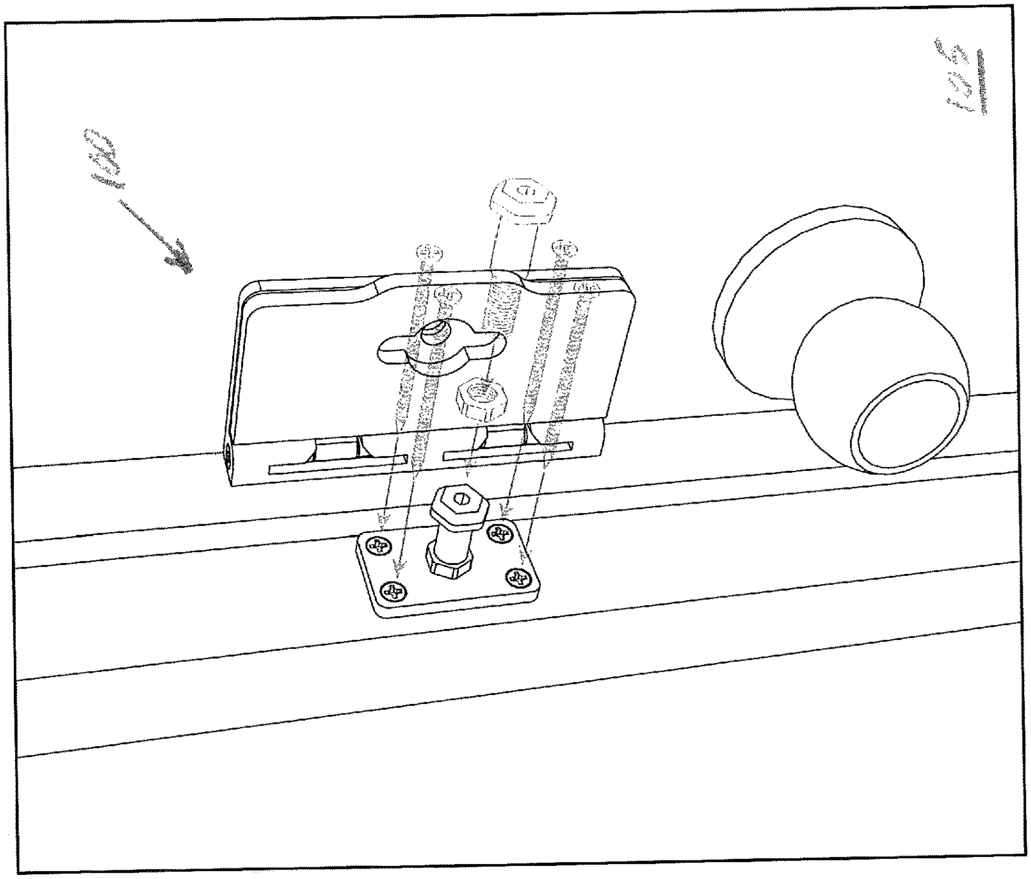
Figure 33:
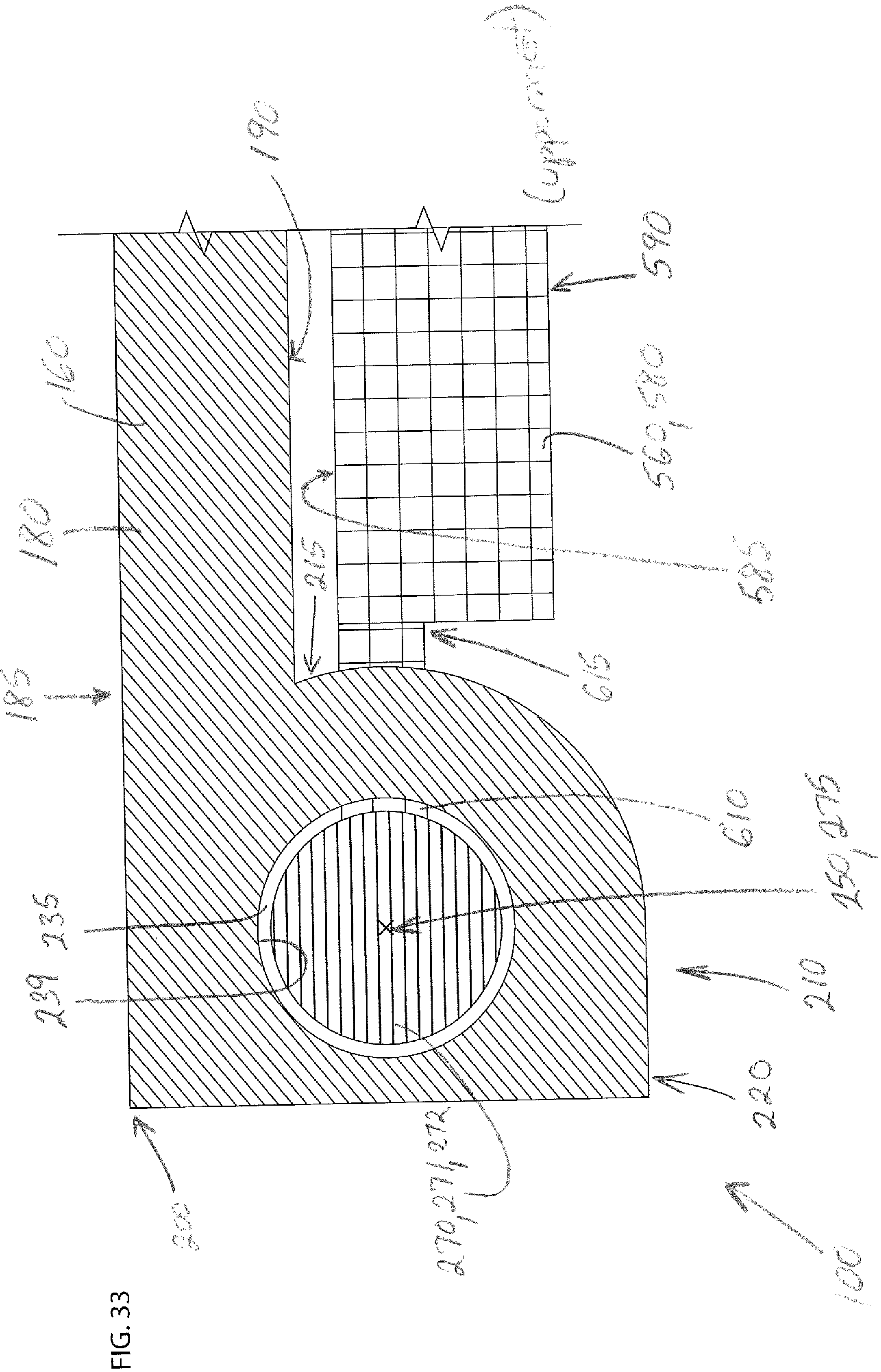
FIGS. 33-38 are simplified, schematic partial cross-section views showing the hinge pin vertical axis area of the door locking device of FIG. 1 with clasp swing plate in various positions including unlocked uppermost, intermediate, and locked lowermost positions thereof.
Figure 34:
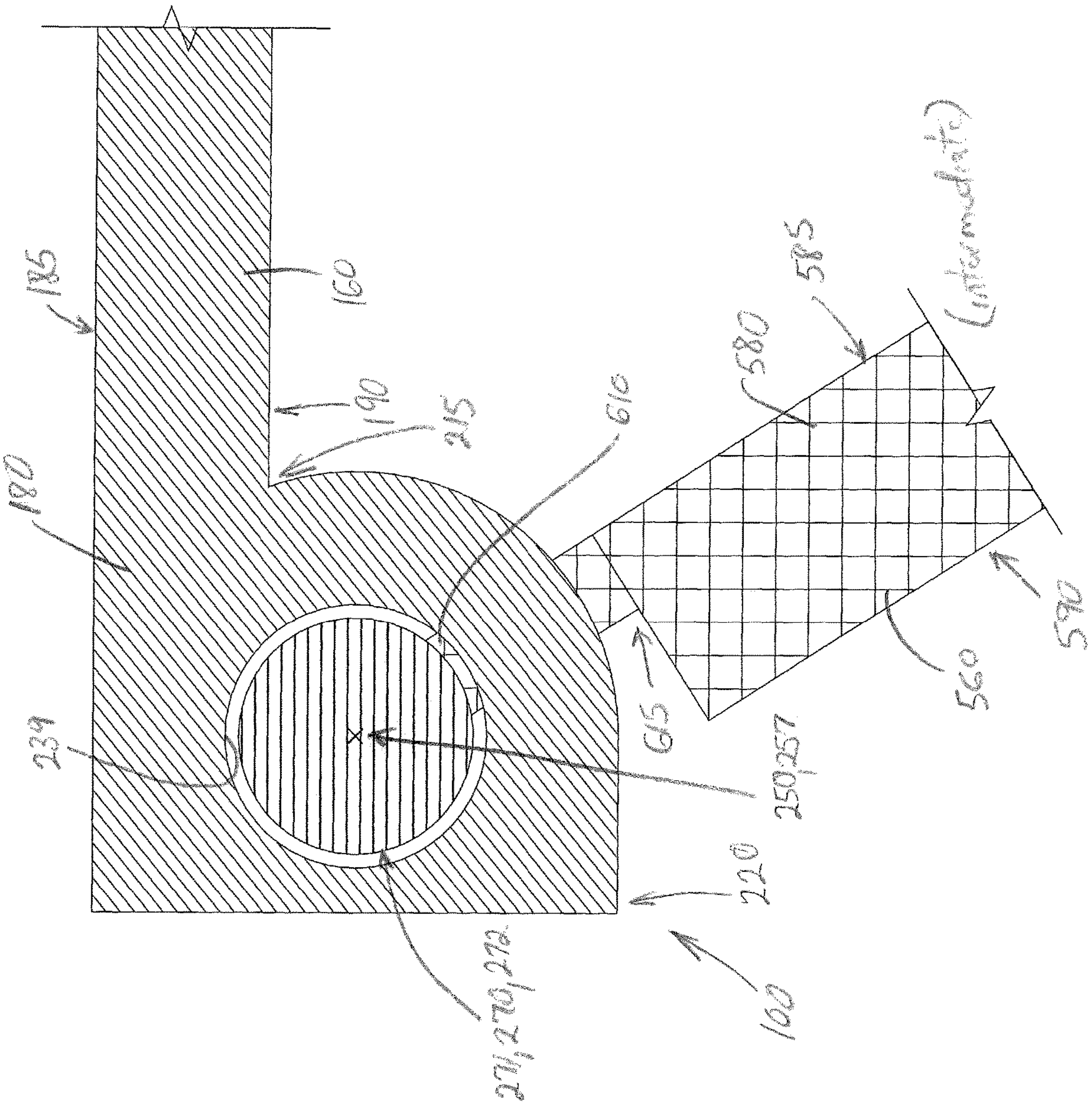
Figure 35:
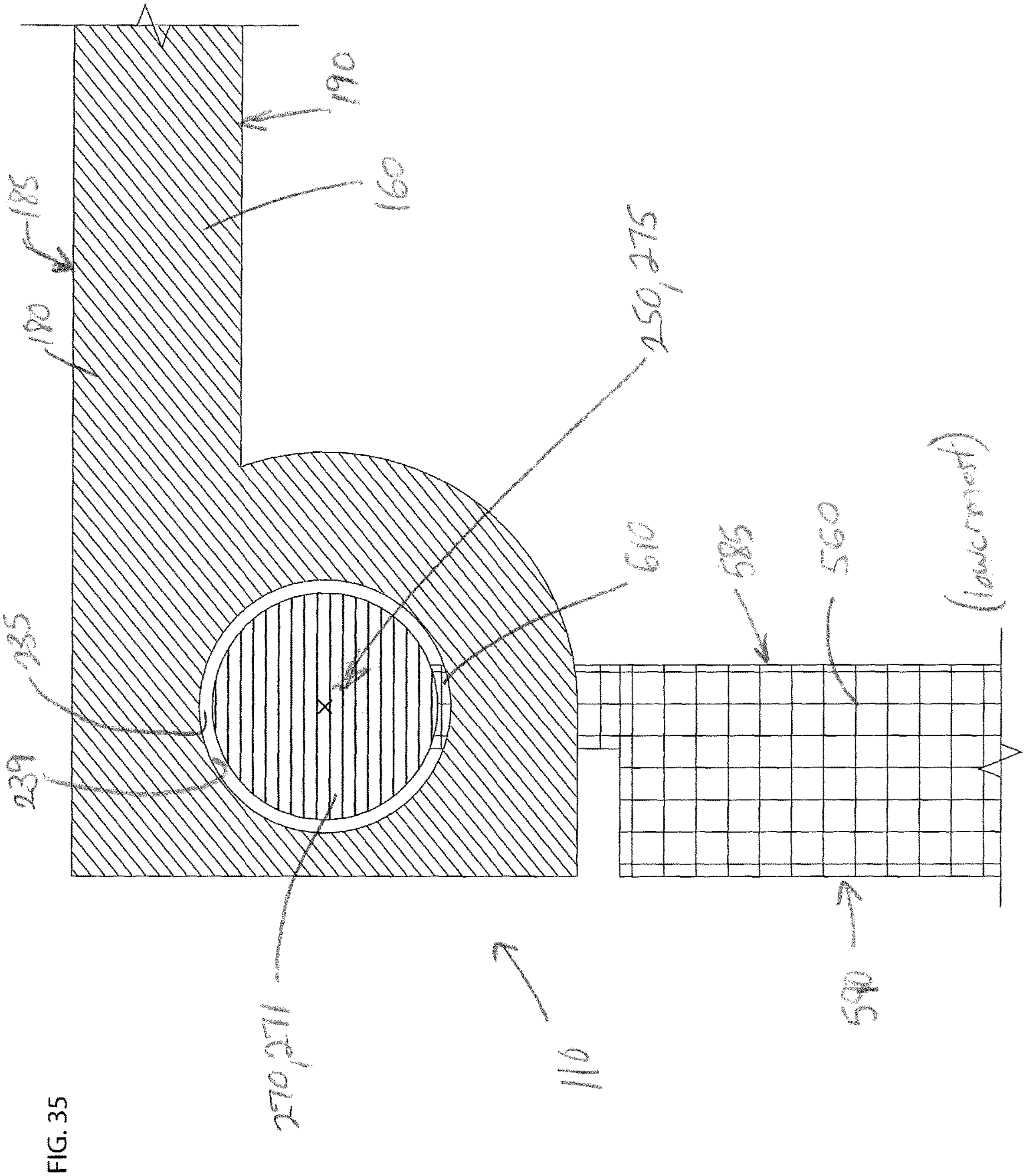
Figure 36:
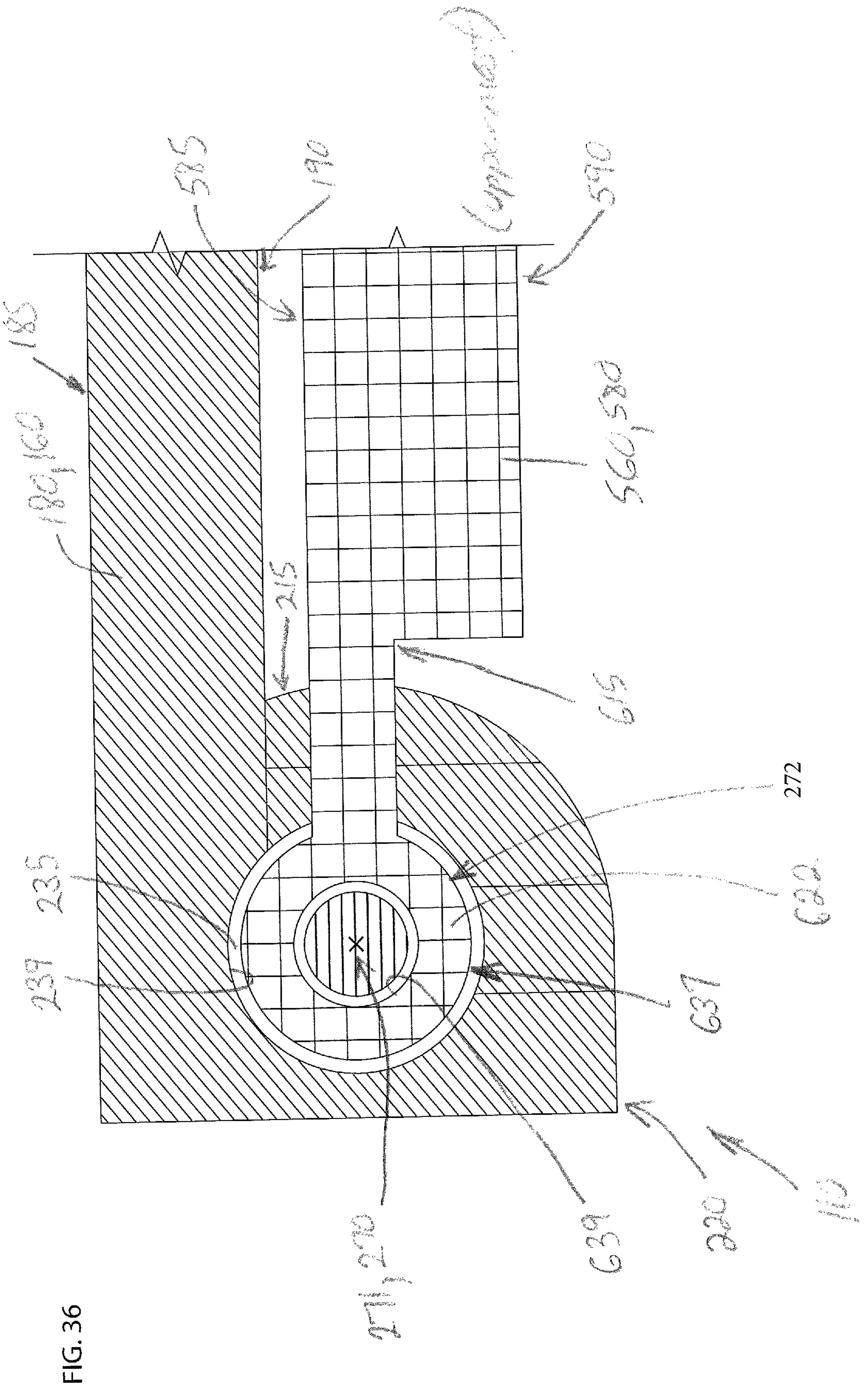
Figure 37:
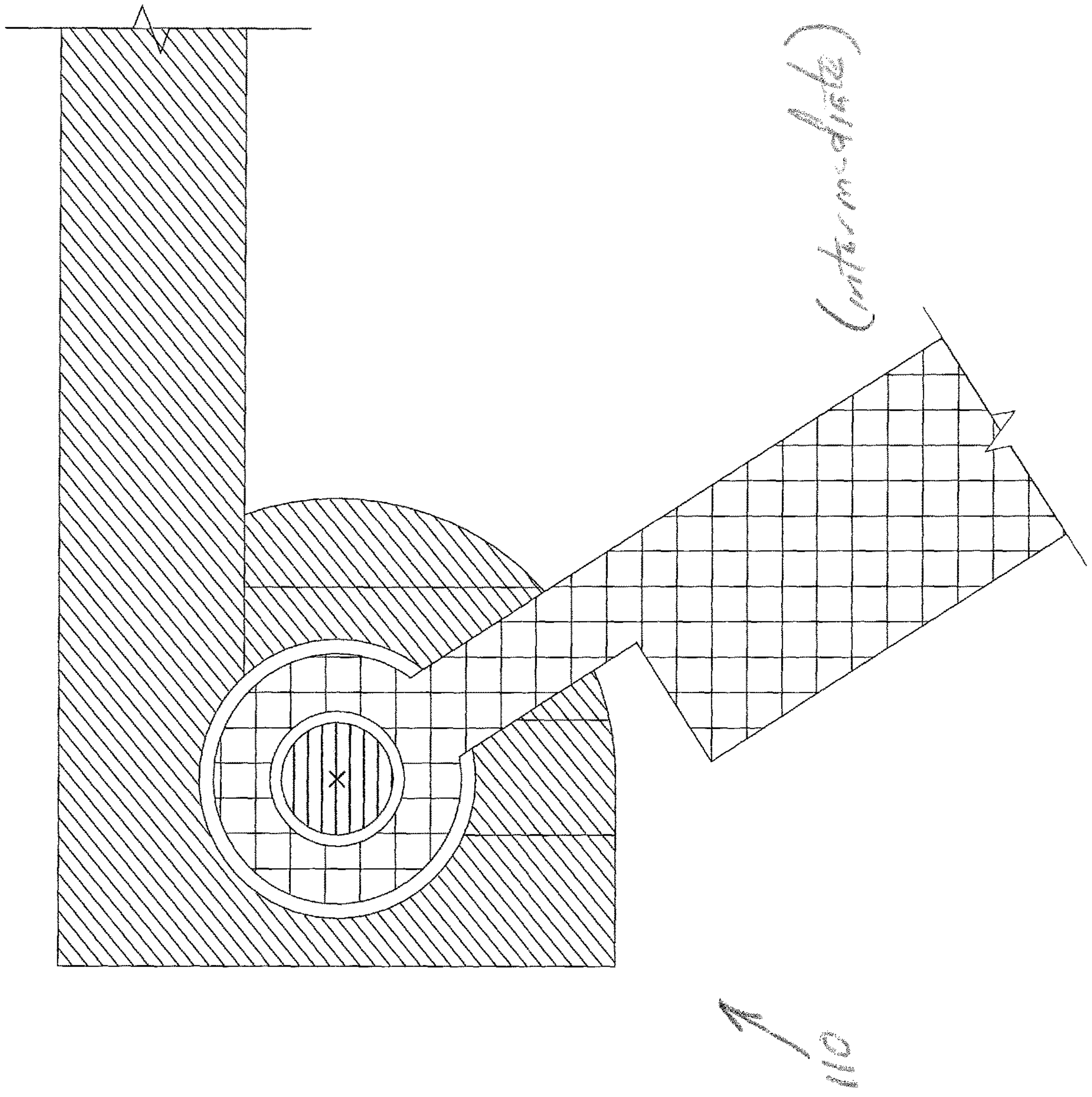
Figure 38:
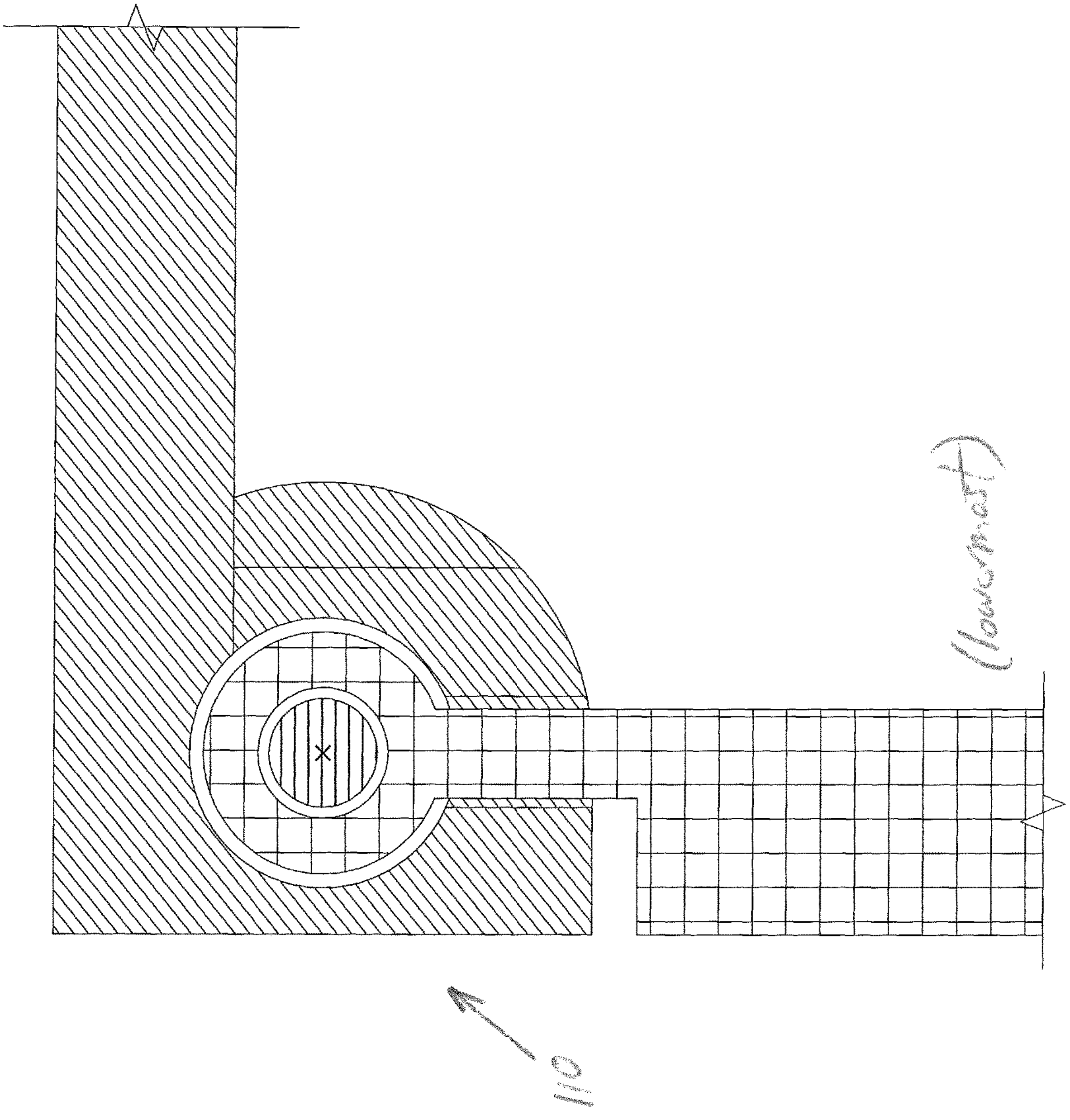
Figure 39:
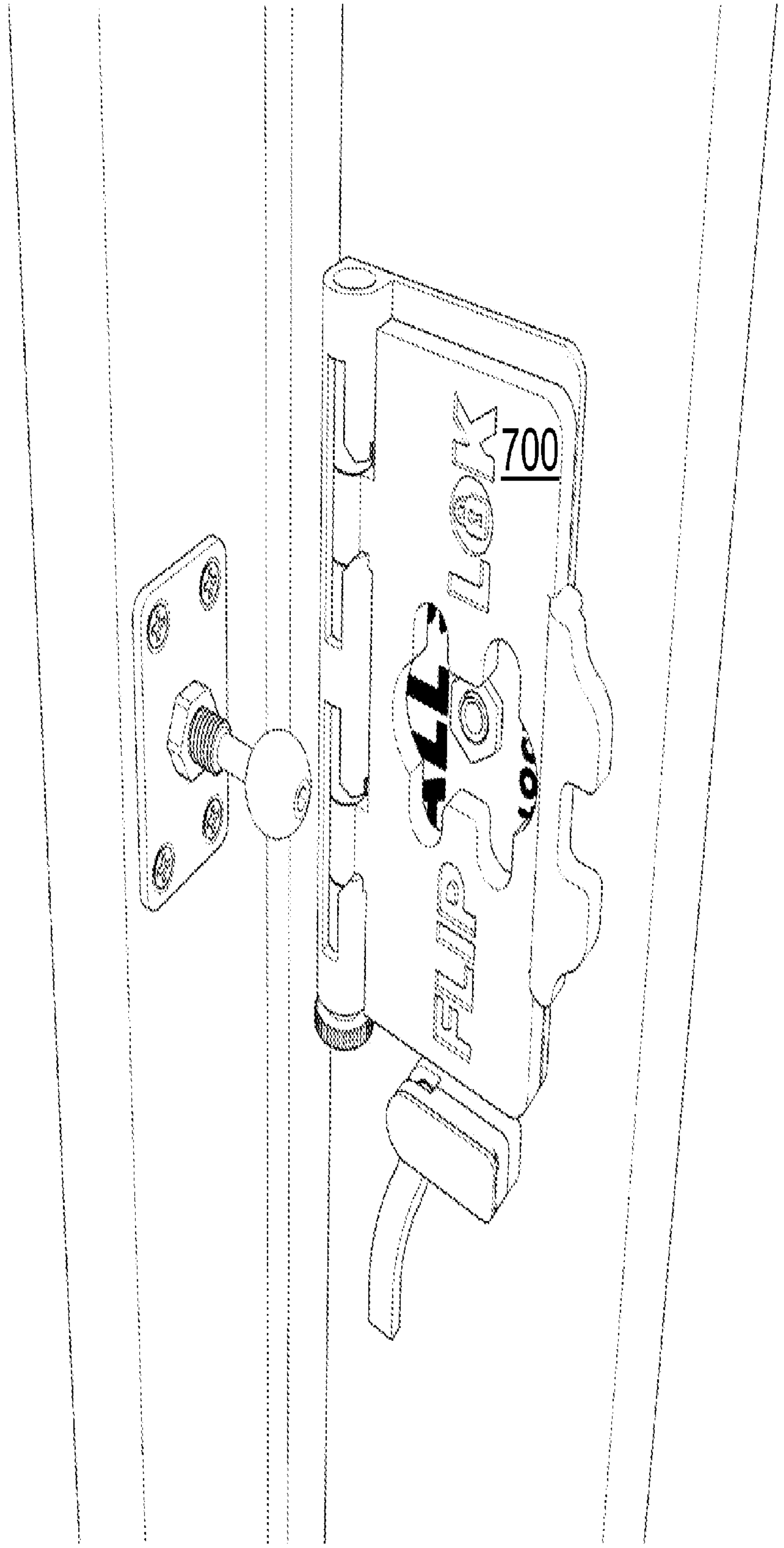
FIG. 39 is a perspective view showing a door locking device in an embodiment with clasp swing plate in unlocked resting uppermost position thereof.
Figure 40:
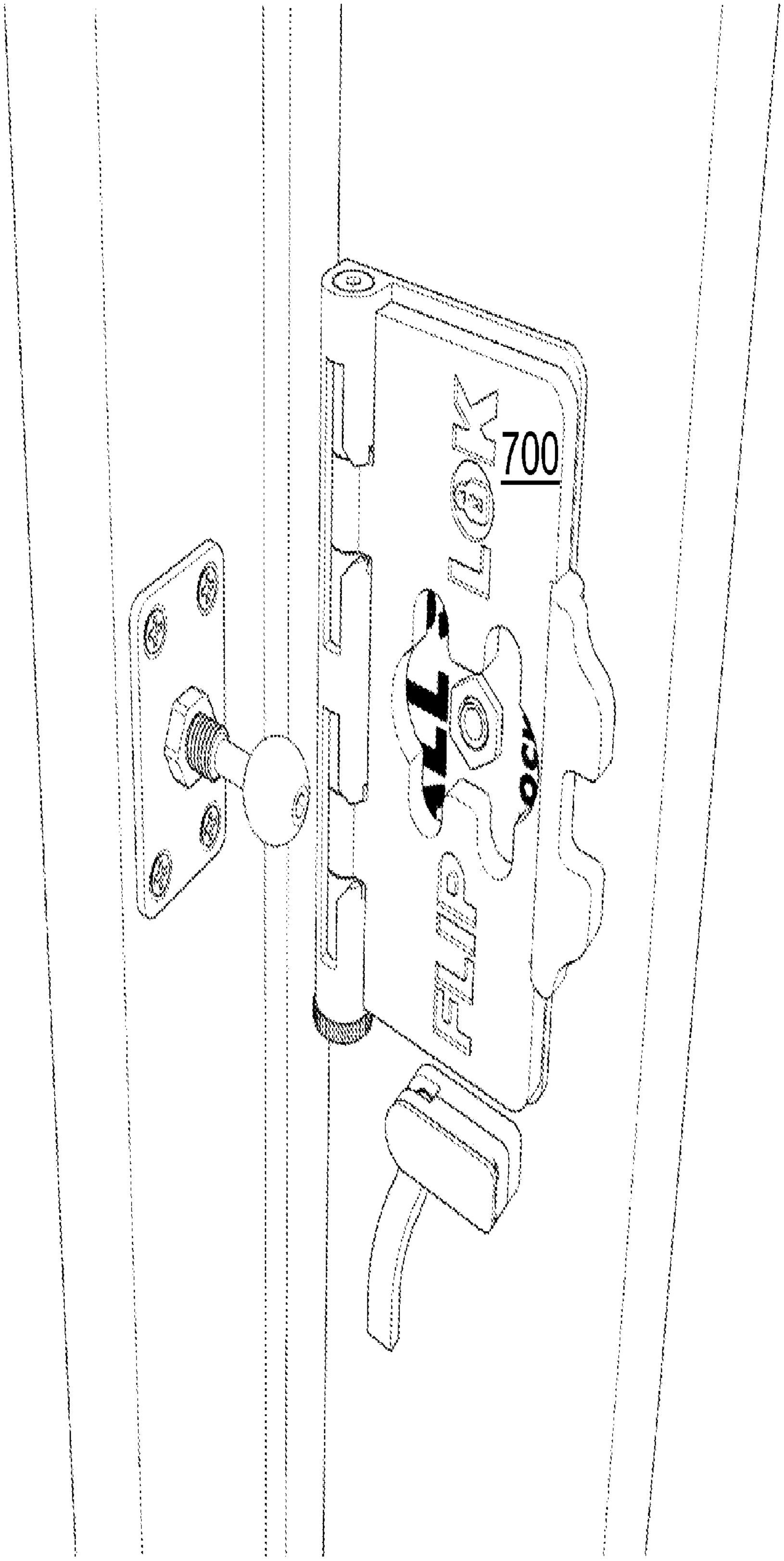
FIG. 40 is a perspective view showing the door locking device of FIG. 39 with clasp swing plate in an unlocked intermediate pivot position thereof, raised in vertical translation movement to a travel height and remaining immediately above the unlocked resting uppermost position depicted in FIG. 39.
Figure 41:
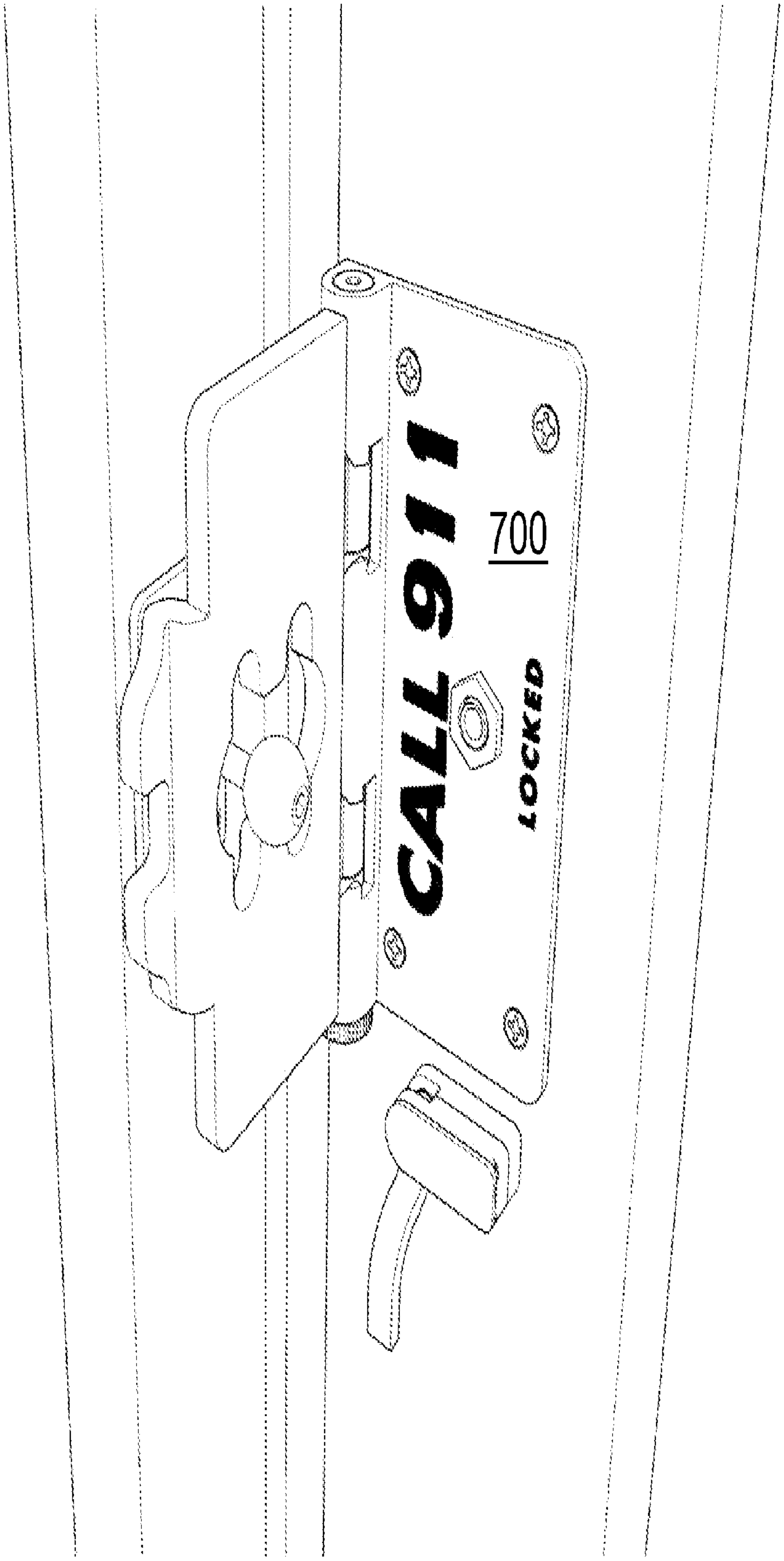
FIG. 41 is a perspective view showing the door locking device of FIG. 40 with clasp swing plate in a locked intermediate pivot position thereof, raised in vertical translation movement to a travel height and pivoted to a locked angular position facing the door frame and immediately above the locked resting lowermost position depicted in FIG. 42, receiving the anchor post.
Figure 42:
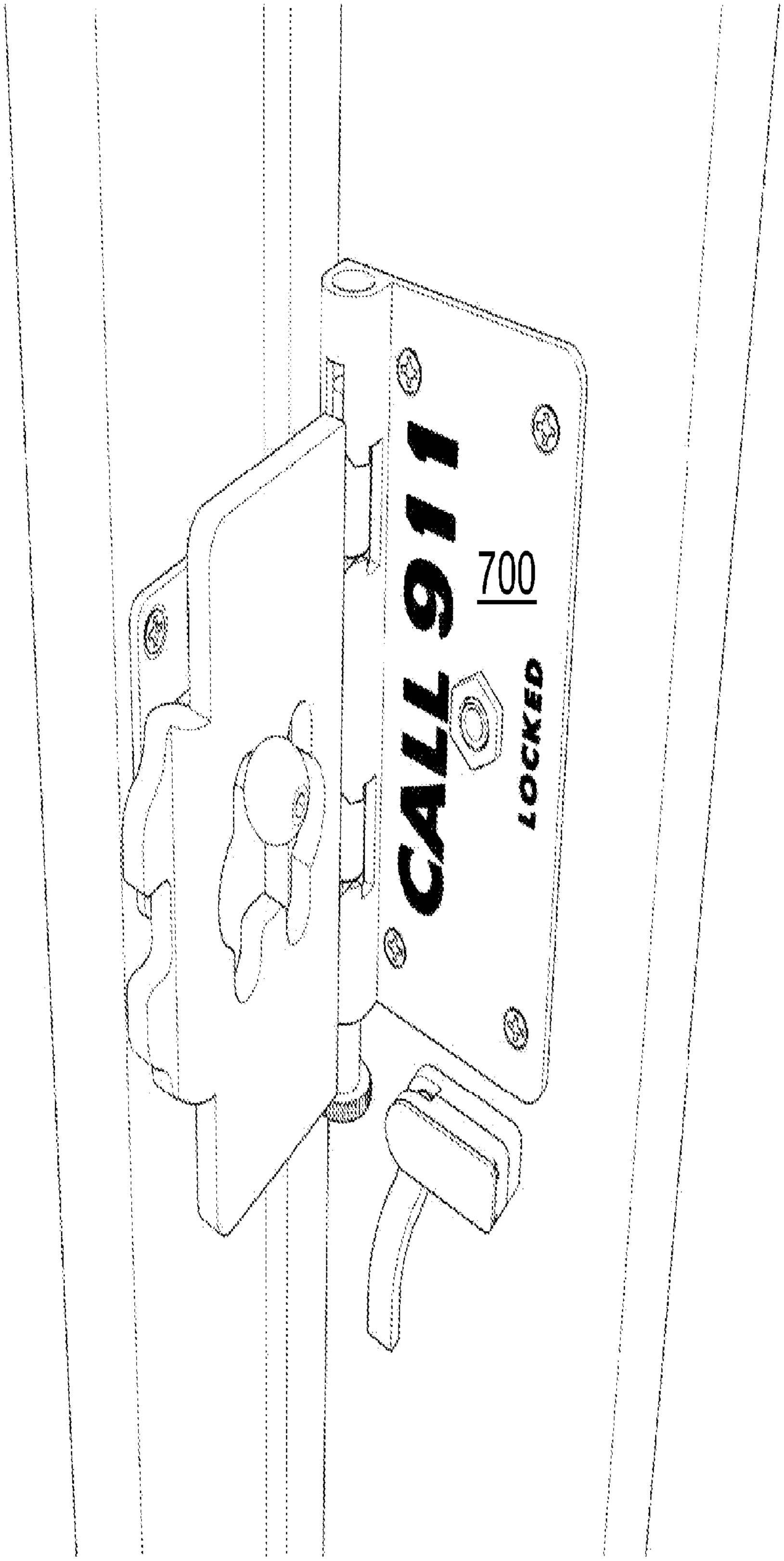
FIG. 42 is a perspective view showing the door locking device of FIG. 41 with clasp swing plate in a locked lowermost position thereof, lowered in vertical translation movement to a lowermost height and remaining immediately below the locked intermediate pivot position depicted in FIG. 41, capturing the anchor post.
Figure 43:
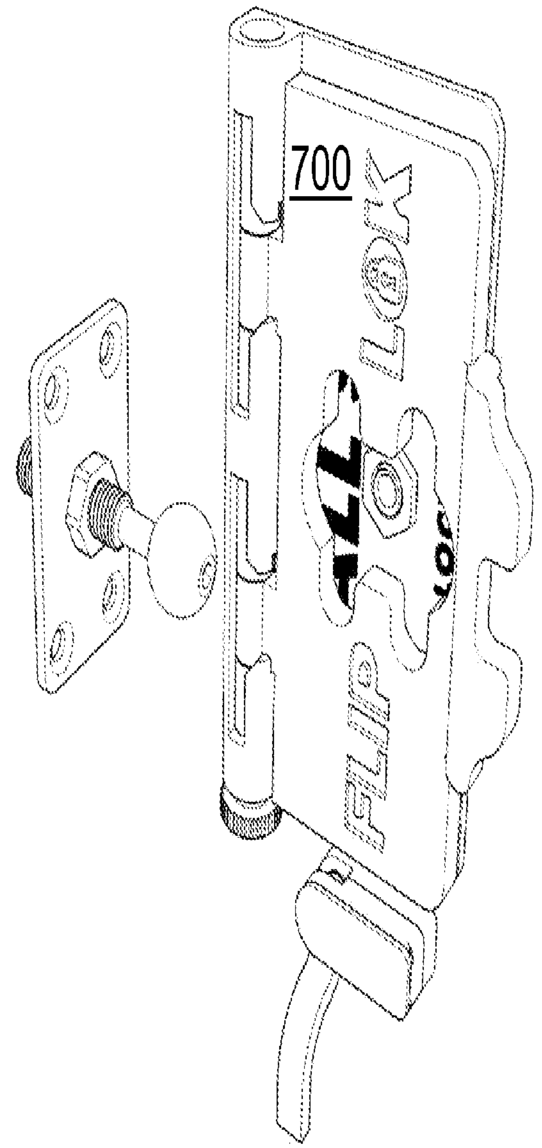
FIG. 43 is a perspective view showing the door locking device of FIG. 42 with clasp swing plate in an unlocked position thereof, lowered in vertical translation position to a lowermost height and remaining immediately below the unlocked intermediate pivot position depicted in FIG. 42.
Figure 44:
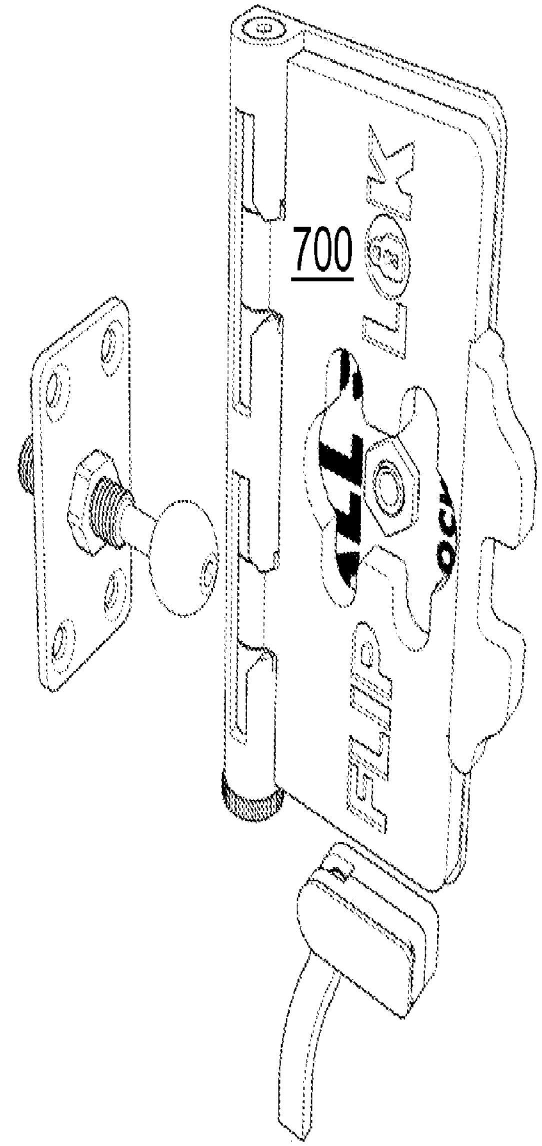
FIG. 44 is a perspective view showing the door locking device of FIG. 43 with clasp swing plate in an unlocked intermediate pivot position thereof, raised in vertical translation position to a travel height and remaining immediately above the unlocked position depicted in FIG. 43.
Figure 45:
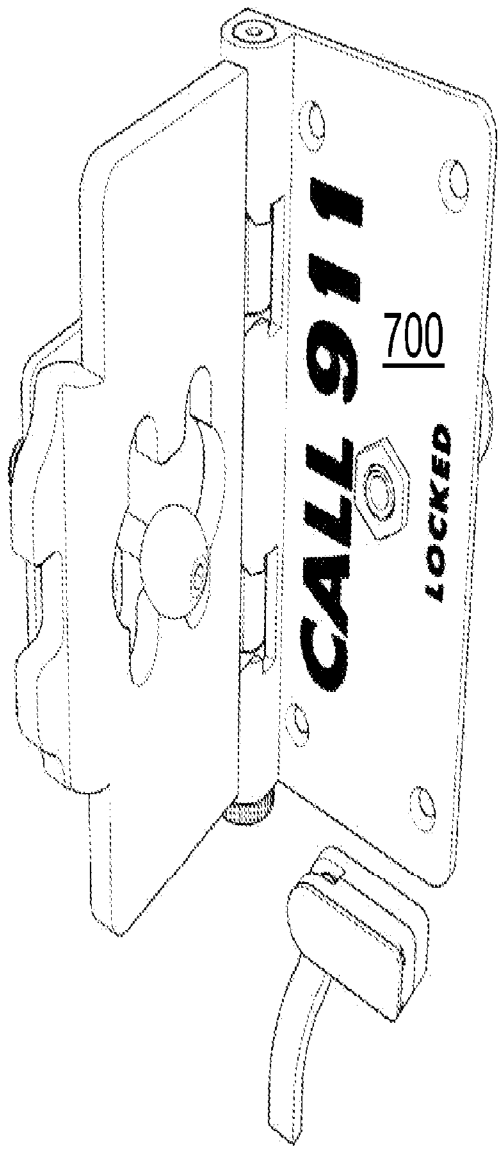
FIG. 45 is a perspective view similar to FIG. 41.
Figure 46:
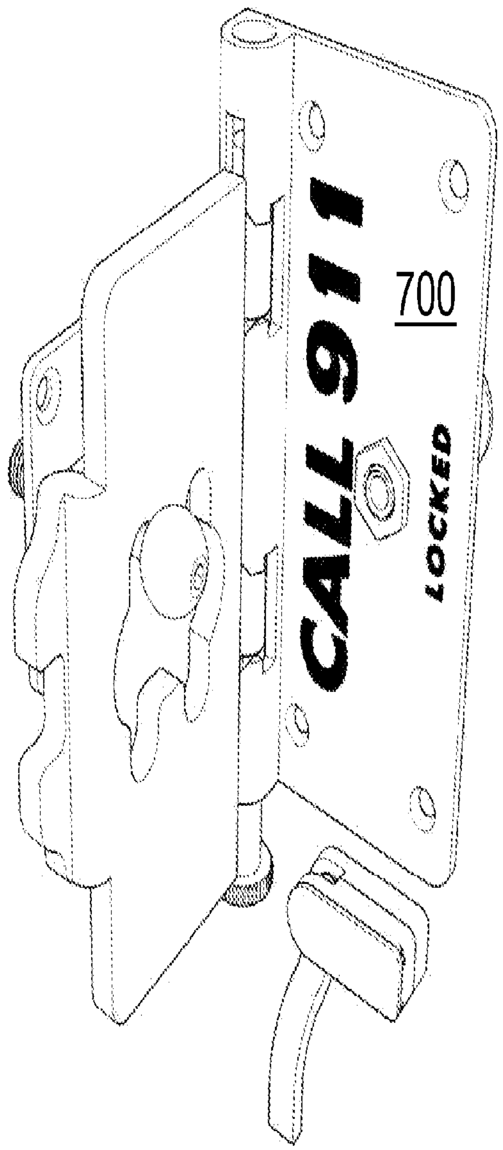
FIG. 46 is a perspective view similar to FIG. 42.
Figure 48A:
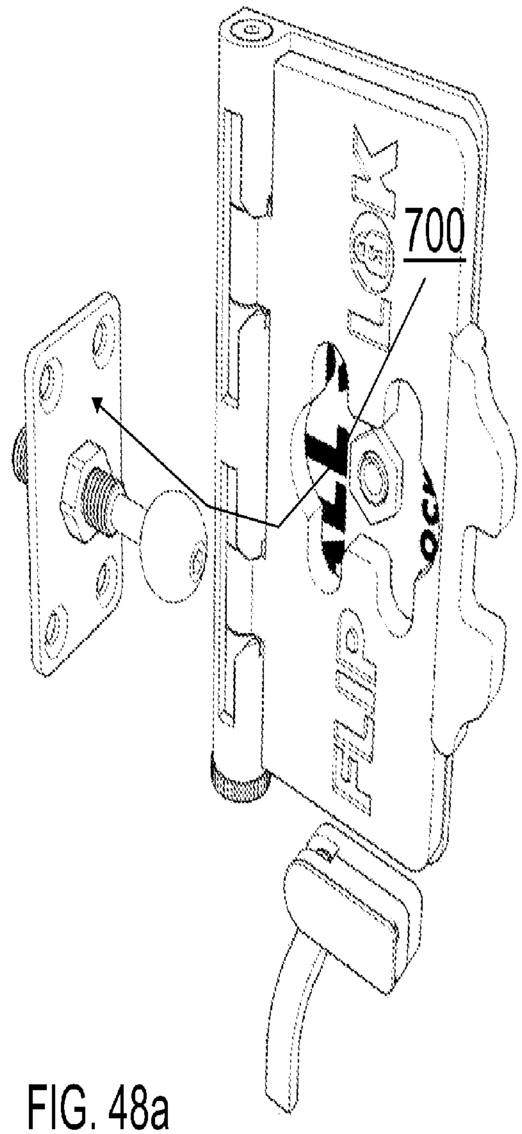
FIG. 48*a* is a perspective view similar to FIG. 44.
Figure 48B:
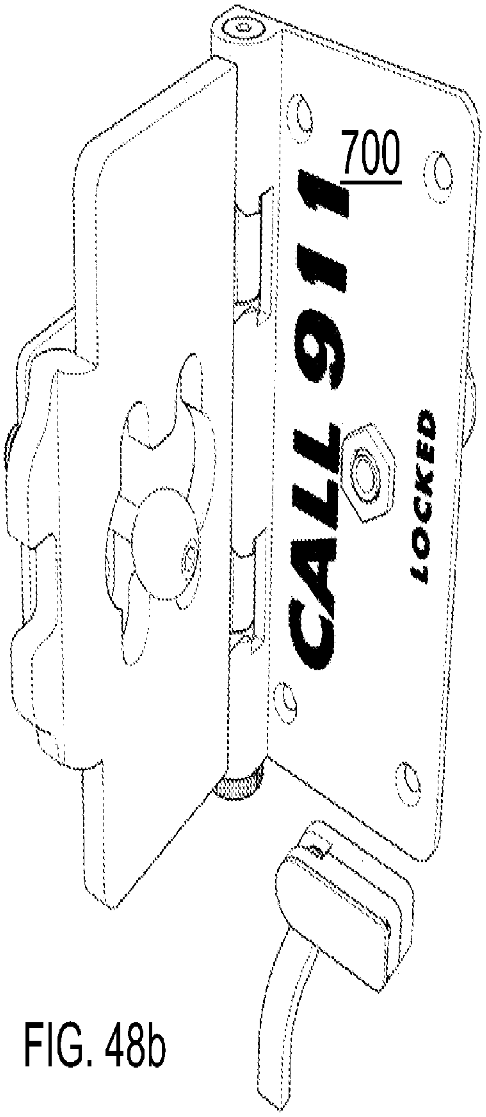
FIG. 48*b* is a perspective view similar to FIG. 45.
Figure 49A:
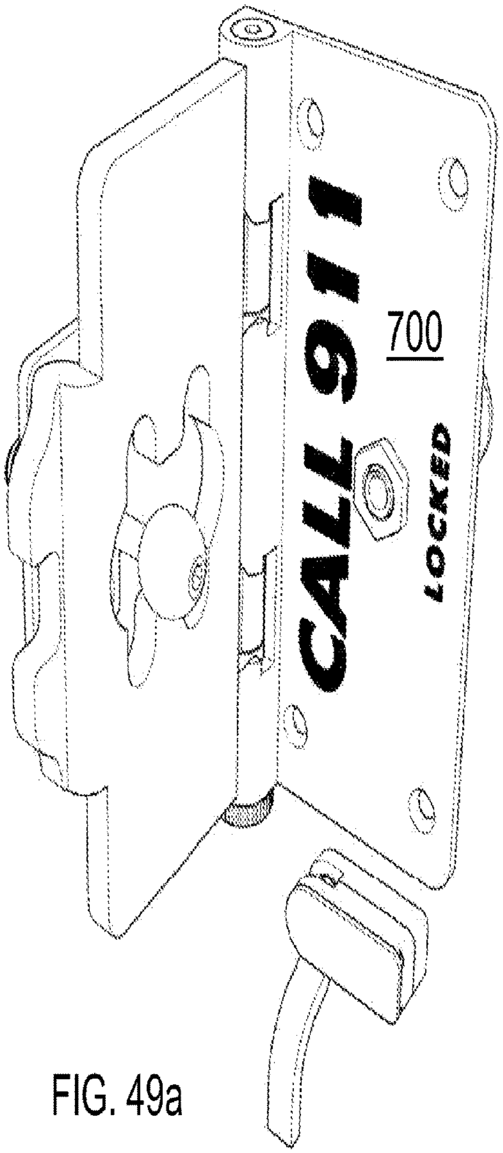
FIG. 49*a* is a perspective view similar to FIG. 48*b*.
Figure 49B:
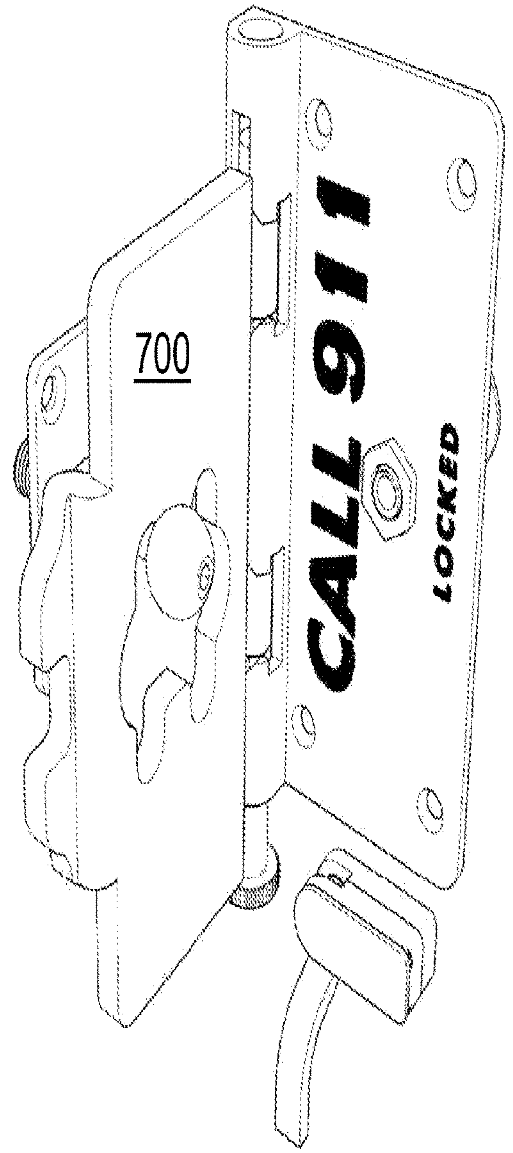
FIG. 49*b* is a perspective view similar to FIG. 46.
Figure 50:
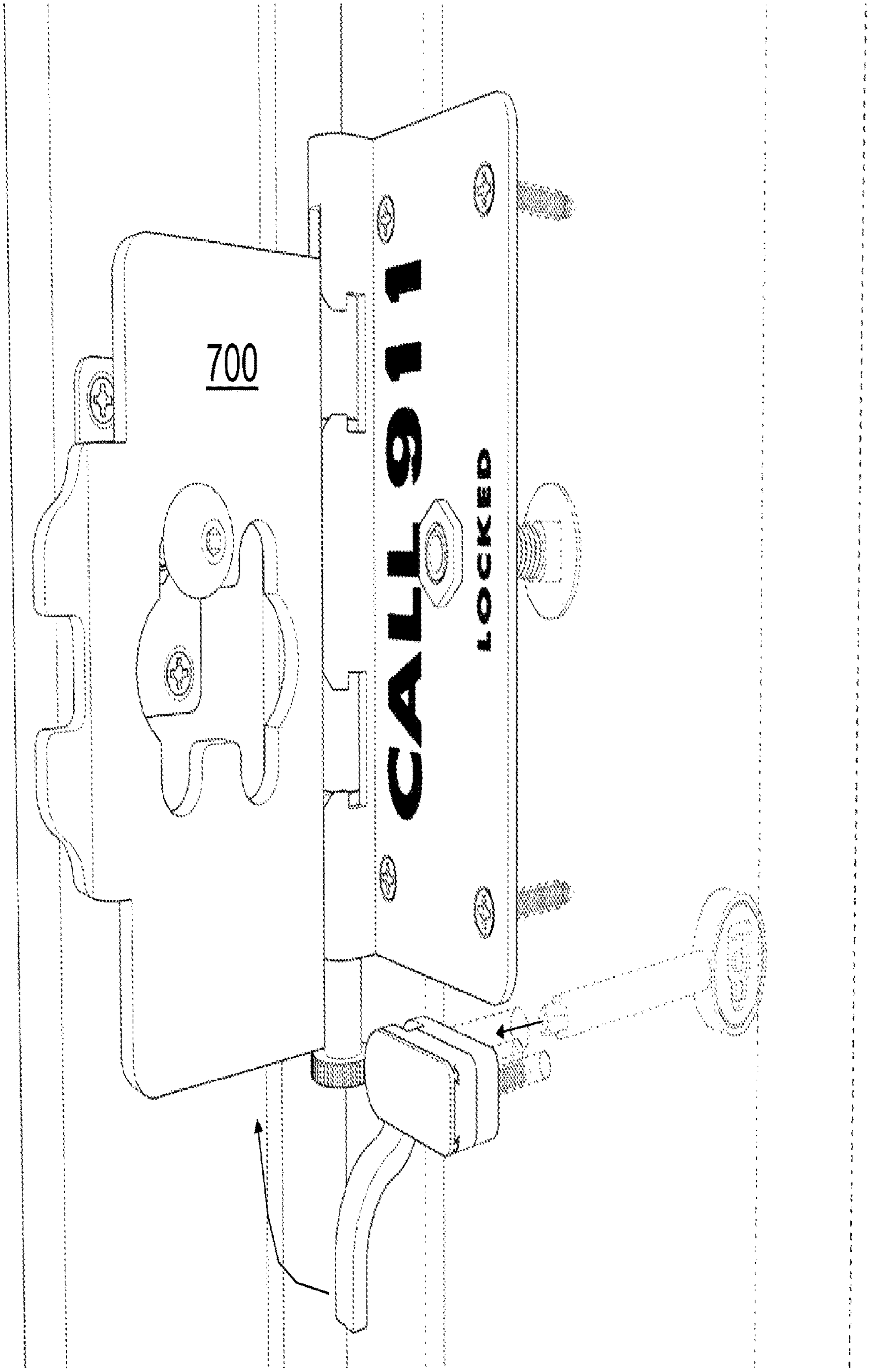
FIG. 50 is a perspective partial transparent view similar to FIG. 49*b*, with hidden detail shown in broken lines.
Figure 51:
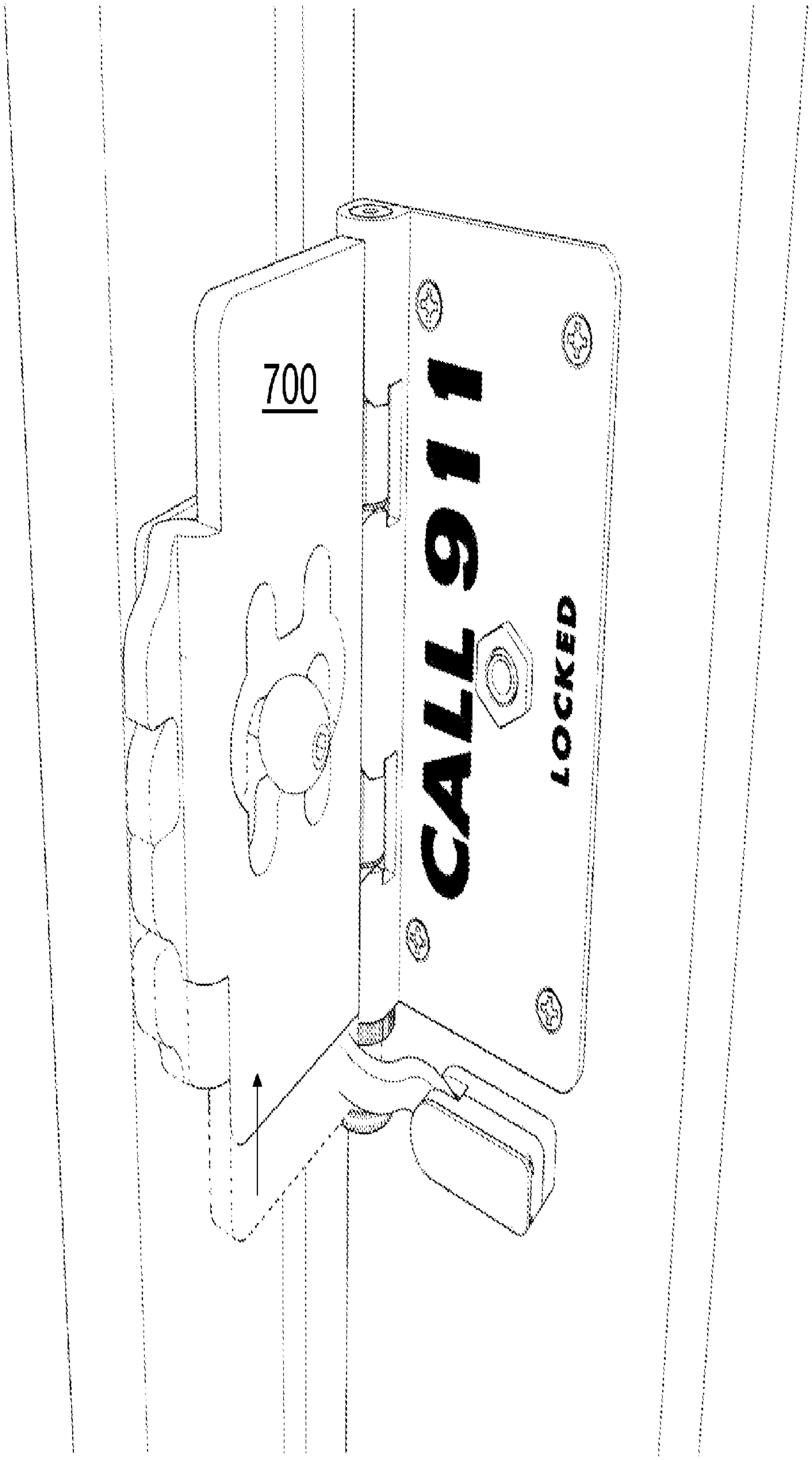
FIG. 51 is a perspective view similar to FIG. 48*b*.
Figure 52:
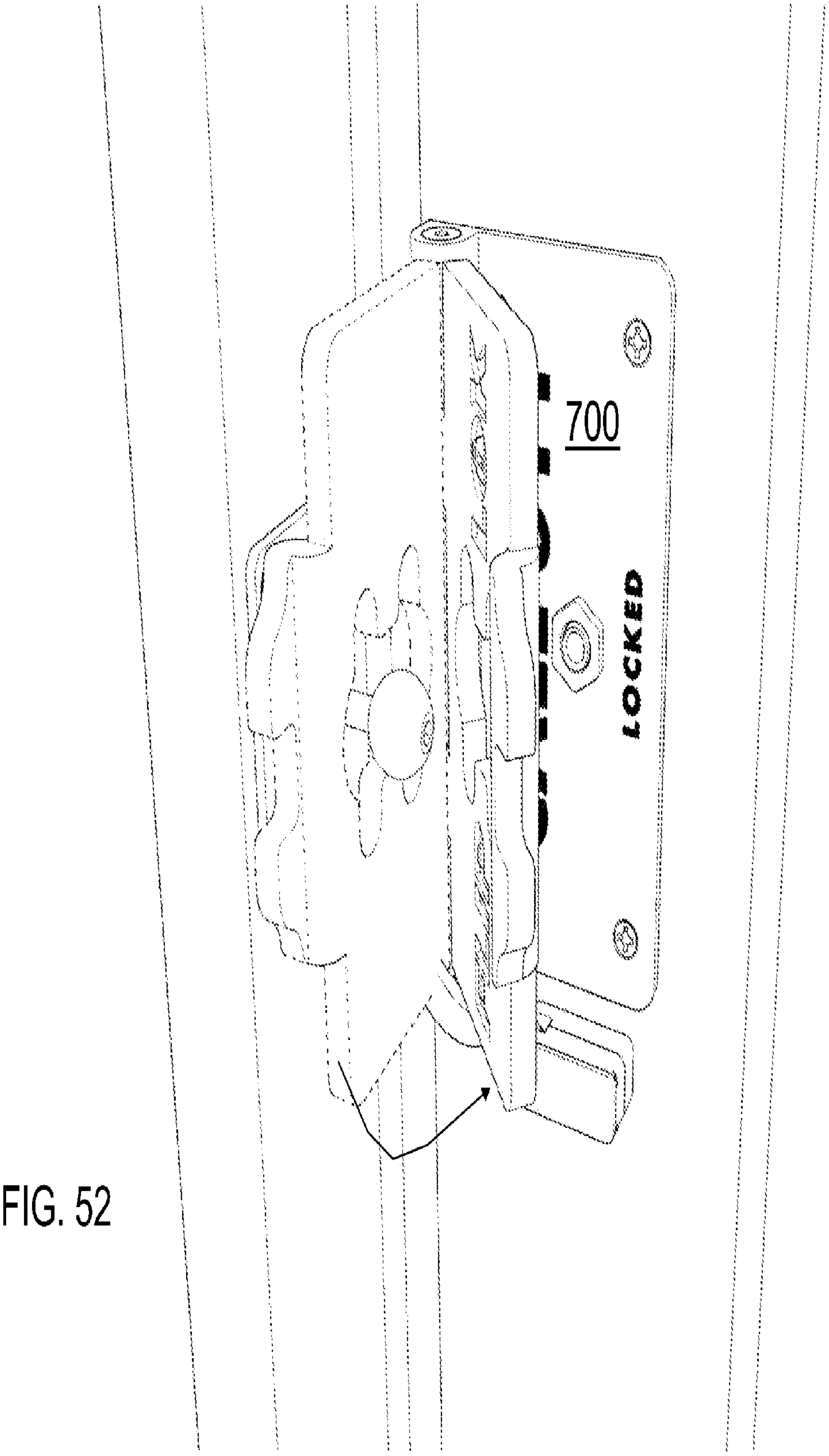
FIG. 52 is a perspective view similar to FIG. 51 and also showing the clasp swing plate in an intermediate pivot position.
Figure 53:
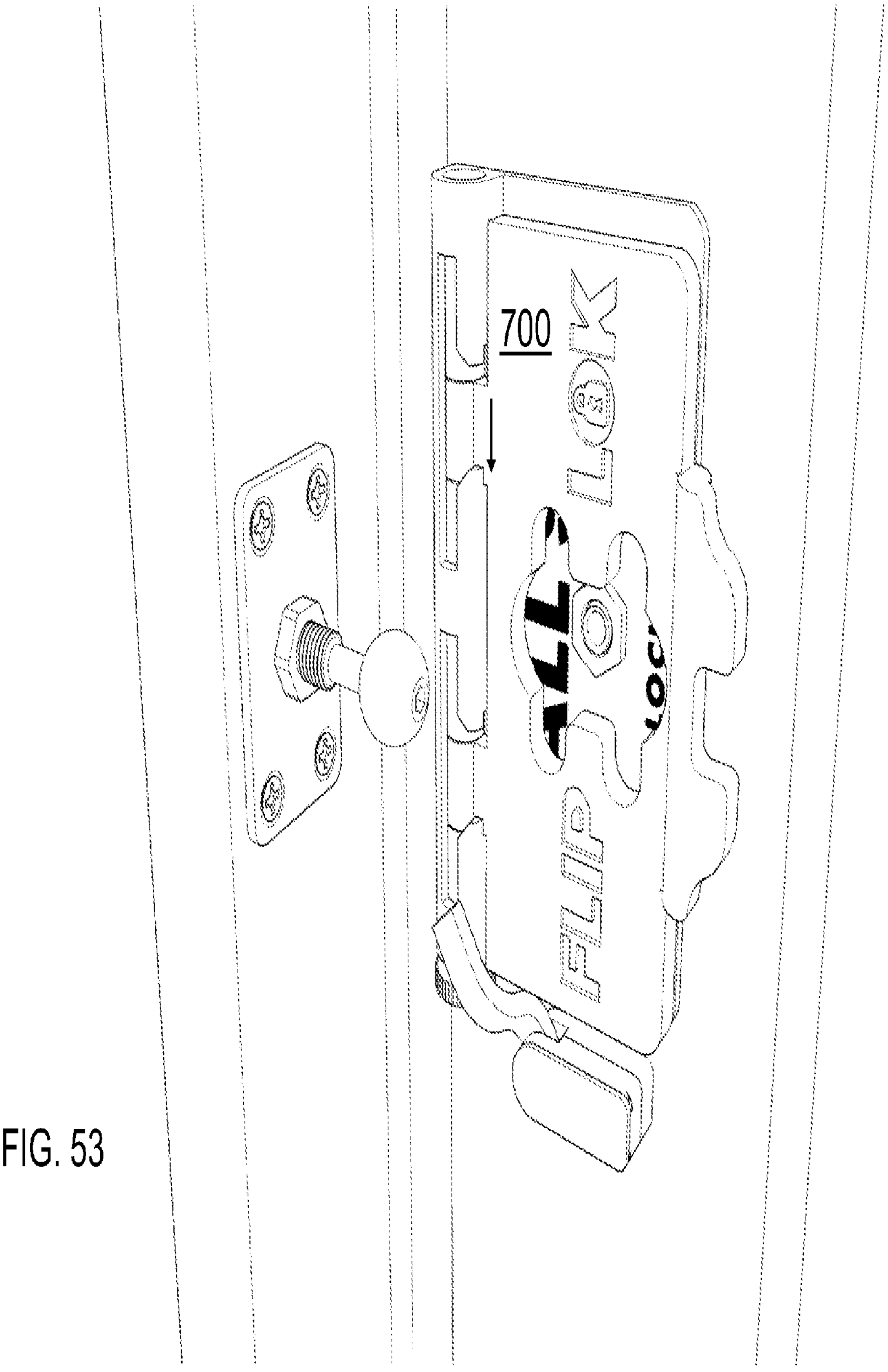
FIG. 53 is a perspective view similar to FIG. 40.
Figure 54A:
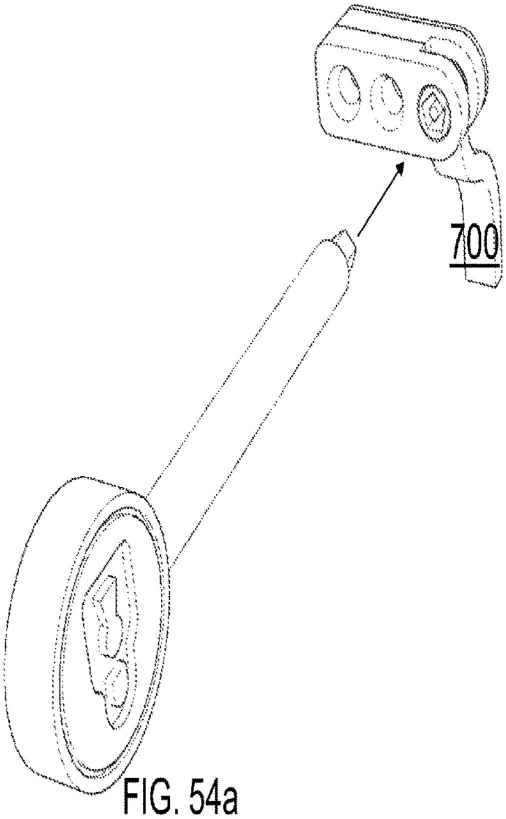
FIGS. 54*a*, 54*b*, and 54*c* are partial perspective views showing positions of a manual key.
Figure 54B:
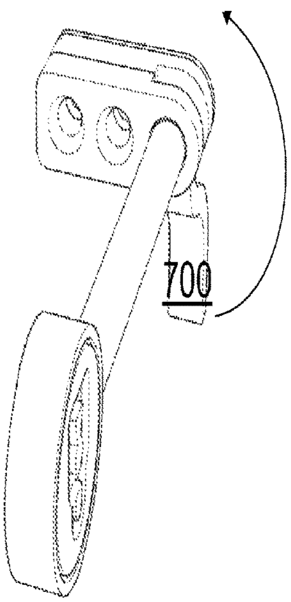
Figure 54C:
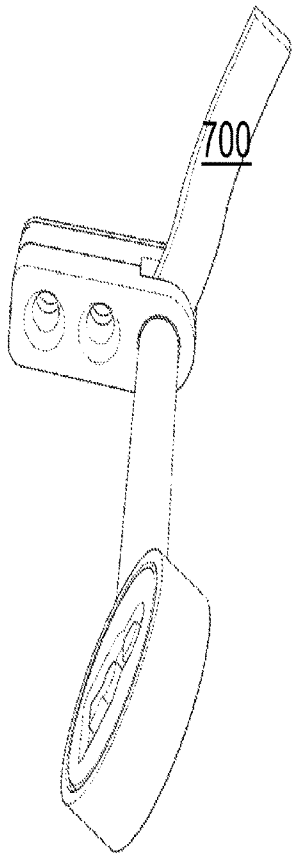
Figure 55:
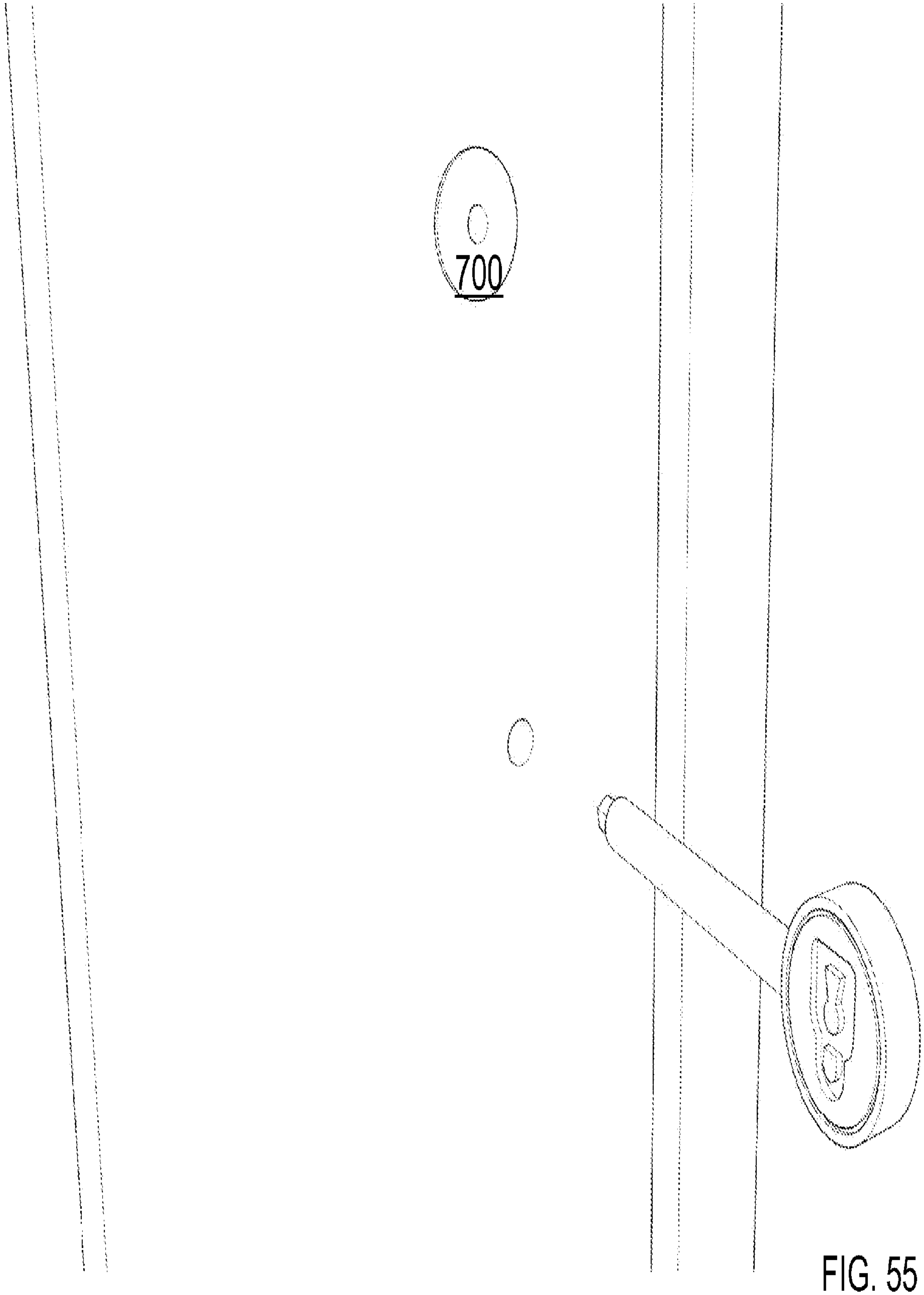
FIG. 55 is an opposite partial perspective view showing hidden detail located on an opposite surface of the door.
Figure 56:
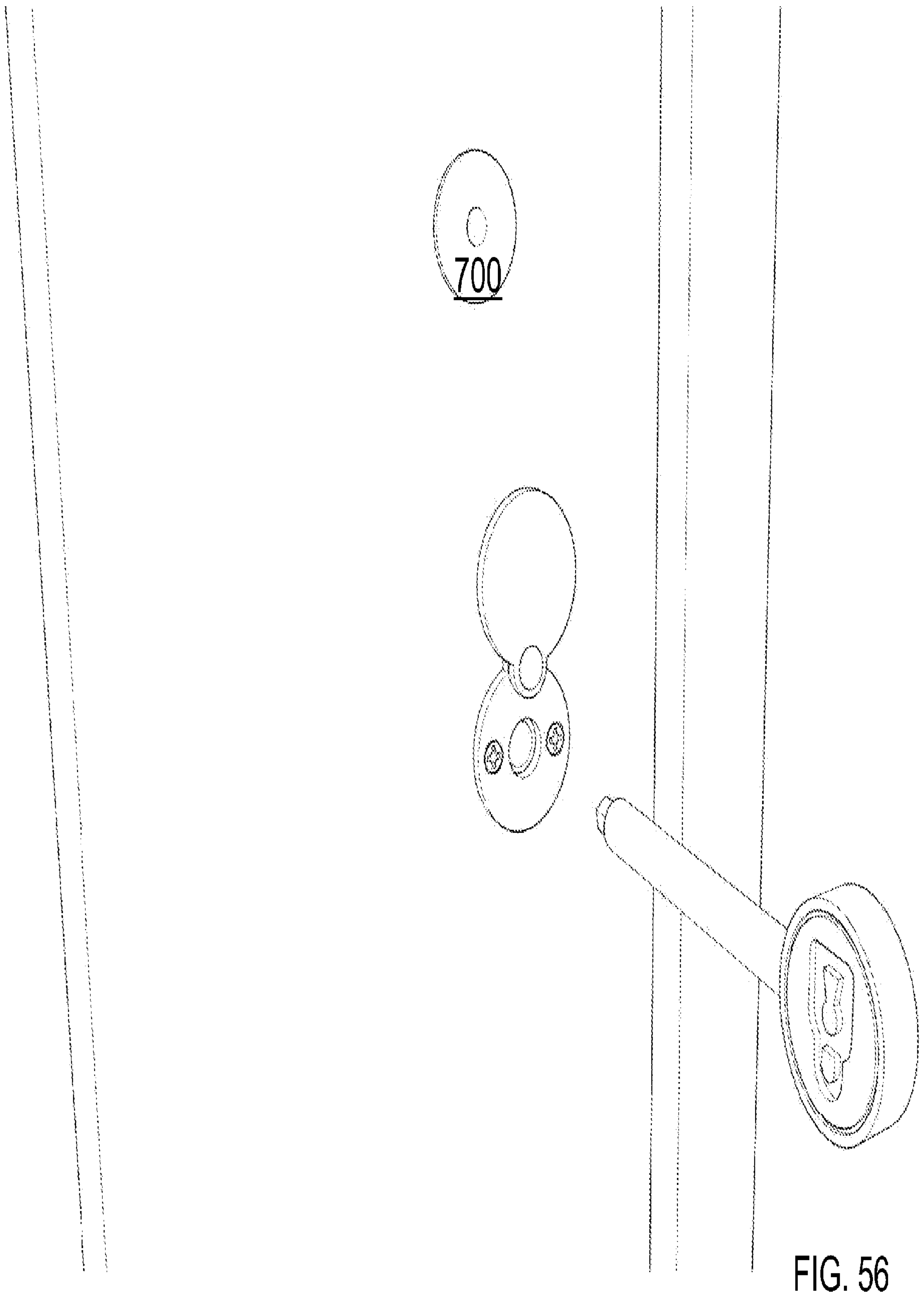
FIG. 56 is an opposite partial perspective view similar to FIG. 55.
Figure 57:
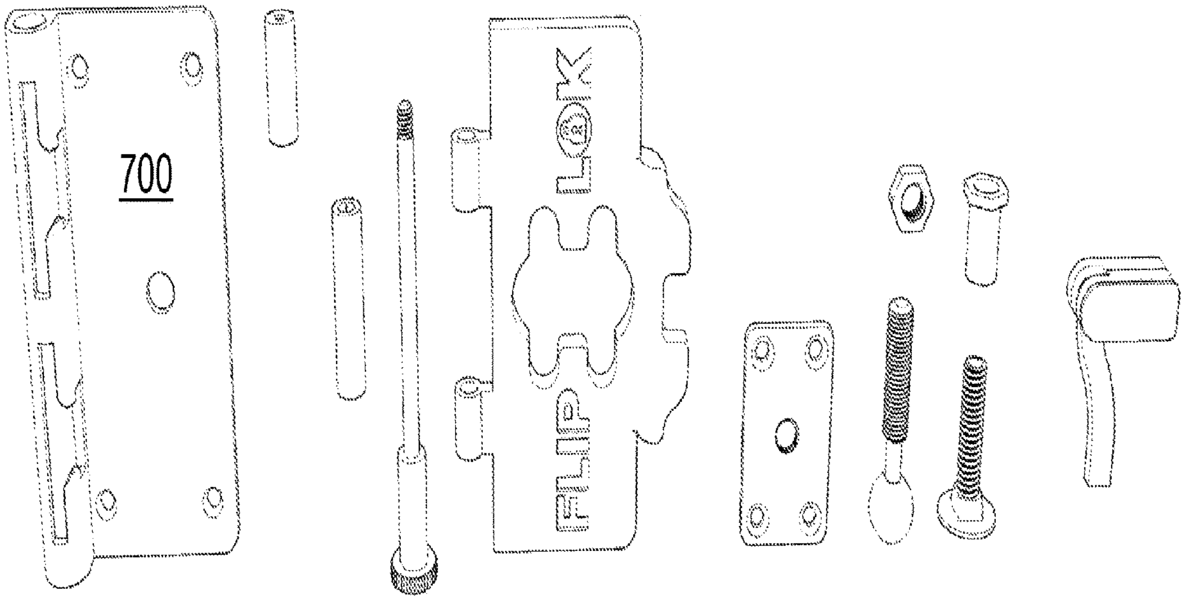
FIG. 57 is a simplified partial exploded view of the door locking device shown generally in FIGS. 39-57.

Referring to FIG. 1, door 105 may be configured for use with door locking device 100 of this disclosure. Door body 115 may include a first device mounting aperture 140 (shown in FIG. 24) defined in the door body 115. The first device mounting aperture 140 may extend through the door body 115 to connect the door interior surface 120 with the door exterior surface. The first device mounting aperture 140 may be spaced apart from the door outside edge 130 at a first offset distance in the horizontal direction.

As shown in FIG. 1, door locking device 110 may include a mounting plate 160 configured to be secured to the door interior surface 120. Door locking device 100 may include a fastener 165 suitable to secure mounting plate 160 to door body 115 against door interior surface 120. Although other suitable fasteners 165 may be used, in the illustrated embodiment, fastener 165 may be a suitable first threaded fastener combination 170. In an exemplary embodiment as shown in FIG. 1, first threaded fastener combination 170 may include an elevator bolt 174 which may have a bolt stem having male threads configured for mating threaded engagement with a nut 173 (FIG. 3) having female threads. Door locking device 100 may include a plurality of first minor fasteners 172 suitable to be received in a corresponding plurality of minor apertures 196 (FIG. 2) cooperating to secure mounting plate 160 to door body 115 against door interior surface 120.

As shown in FIG. 1, mounting plate 160 may include a first major body 180 having a planar first rear surface 185 configured to abut the door interior surface 120. First major body 180 may have a planar first front surface 190 disposed in opposed parallel relationship to the first rear surface 185. Mounting plate 160 may include a first mounting aperture 195 extending through the first major body 180 from the first rear surface 185 to first front surface 190 in perpendicular relationship with the same first front and rear surfaces 185,190. First mounting aperture 195 may be positioned in common axial alignment with the first device mounting aperture 140 (FIG. 24) of the door 105 to receive the first threaded fastener combination 170 extending therethrough. The first threaded fastener combination 170 in the aligned apertures 195,140 may extend through door body 115 and the first major body 180 to secure the mounting plate 160 against door body 115 with the first rear surface 185 abutting door interior surface 120.

As shown in FIG. 1, mounting plate 160 may have a first outside edge 200 (shown in FIG. 3) may have a vertical axis 201 (shown in FIG. 3) proximate the door outside edge 130 (shown in FIG. 1). Mounting plate 160 may have a set of first receiver ears 210 proximate first outside edge 200. The set of first receiver ears 210 may be spaced apart along an elongated hinge pin assembly 270 may have a hinge pin vertical axis 275. The hinge pin vertical axis 275 is spaced from door outside edge 130 and first outside edge 200 of mounting plate 160. More particularly, it will be understood that first outside edge 200 of mounting plate 160 is proximate continuous door outside interior edge 132 or corner located at intersection of door outside edge 130 with door interior surface 120. Door outside interior edge 132 extending along a respective vertical axis is continuous.

As shown in FIG. 1, mounting plate 160 may include a set of first receiver bays 290 spaced apart along hinge pin vertical axis 275 adjacent the set of first receiver ears 210 in alternating relationship with the first receiver ears 210. Each of the first receiver bays 290 may be defined adjacent a corresponding first receiver ear 210. In the alternative, the first receiver bays 290 may be defined between two adjacent first receiver ears 210, which may include an upper adjacent and lower adjacent of the first receiver ears 210 located on opposite upper and lower sides of first receiver bay 290 therebetween. The set of first receiver bays 290 may be configured to receive in mating relationship a corresponding set of second receiver ears 610 of an adjacent clasp swing plate 560. The set of second receiver ears 610 may dock in the set of first receiver bays 290 in registration relationship therewith.

As shown in FIG. 1, first receiver ears 210 may extend from first major body 180 of mounting plate 160 in integral fixed relationship therewith. Each of the first receiver ears 210 may include a proximal portion 215 adjoining first major body 180 of mounting plate 160 proximate first outside edge 200 and first front surface 190 thereof. Each of the first receiver ears 210 may include a distal portion 220 spaced from the proximal portion 215 thereof and generally spaced in a lateral direction from first outside edge 200. Each of first receiver ears 210 may include first receiver wall 222 extending to the distal portion 220 from proximal portion 215 and returning from distal portion 220 to proximal portion 215. The first receiver wall 222 defines a first receiver aperture 235 intermediate the distal portion 220 and proximal portion 215. The first receiver wall 222 may have a continuous tubular first receiver inner surface 239 spaced from a first receiver aperture vertical axis 250 in equidistant relationship therefrom, defining a first receiver aperture 235 having a first receiver wall inner radius. The first receiver wall 222 may include continuous first receiver wall outer surface 237 disposed in spaced opposed relationship to the first receiver wall inner surface 239. The first receiver wall 222 in the vertical direction may extend from a continuous first receiver top surface 240 to a continuous first receiver bottom surface 241 disposed in spaced opposing relationship. The first receiver wall 222 may terminate at the continuous first receiver top surface 240. The first receiver top surface 240 may extend from the first receiver wall outer surface 237 to first receiver wall inner surface 239 in perpendicular intersecting relationship therewith. The first receiver top surface 240 may intersect the first receiver wall outer surface 237 at a continuous first top surface outer edge 242 spaced from the first receiver aperture vertical axis 250 in equidistant relationship at a first receiver wall outer radius. The first receiver wall top surface 250 may intersect the first receiver wall inner surface 239 at a continuous first top surface inner edge 243 spaced from the first receiver aperture vertical axis 250 in equidistant relationship at the first receiver wall inner radius.

As shown in FIG. 1, the first receiver wall top surface 240 in a direction perpendicular to the first receiver aperture vertical axis 250 may have a first receiver top surface primary width between the first top surface inner edge 243 and the first top surface outer edge 242, which is a difference between the outer radius and inner radius of first receiver wall 222;

As shown in FIG. 1, the first receiver wall bottom surface 241 may be disposed in spaced opposed relationship to the first receiver wall top surface 240. The first receiver wall 222 may have a substantially uniform width from the first receiver wall top surface 240 to the first receiver wall bottom surface 241. The first receiver wall bottom surface 241 may have a first receiver wall bottom surface primary width between a first bottom surface inner edge 244 and first bottom surface outer edge 247 which is the difference between the first receiver wall outer radius and the first receiver wall inner radius.

Figure 2:
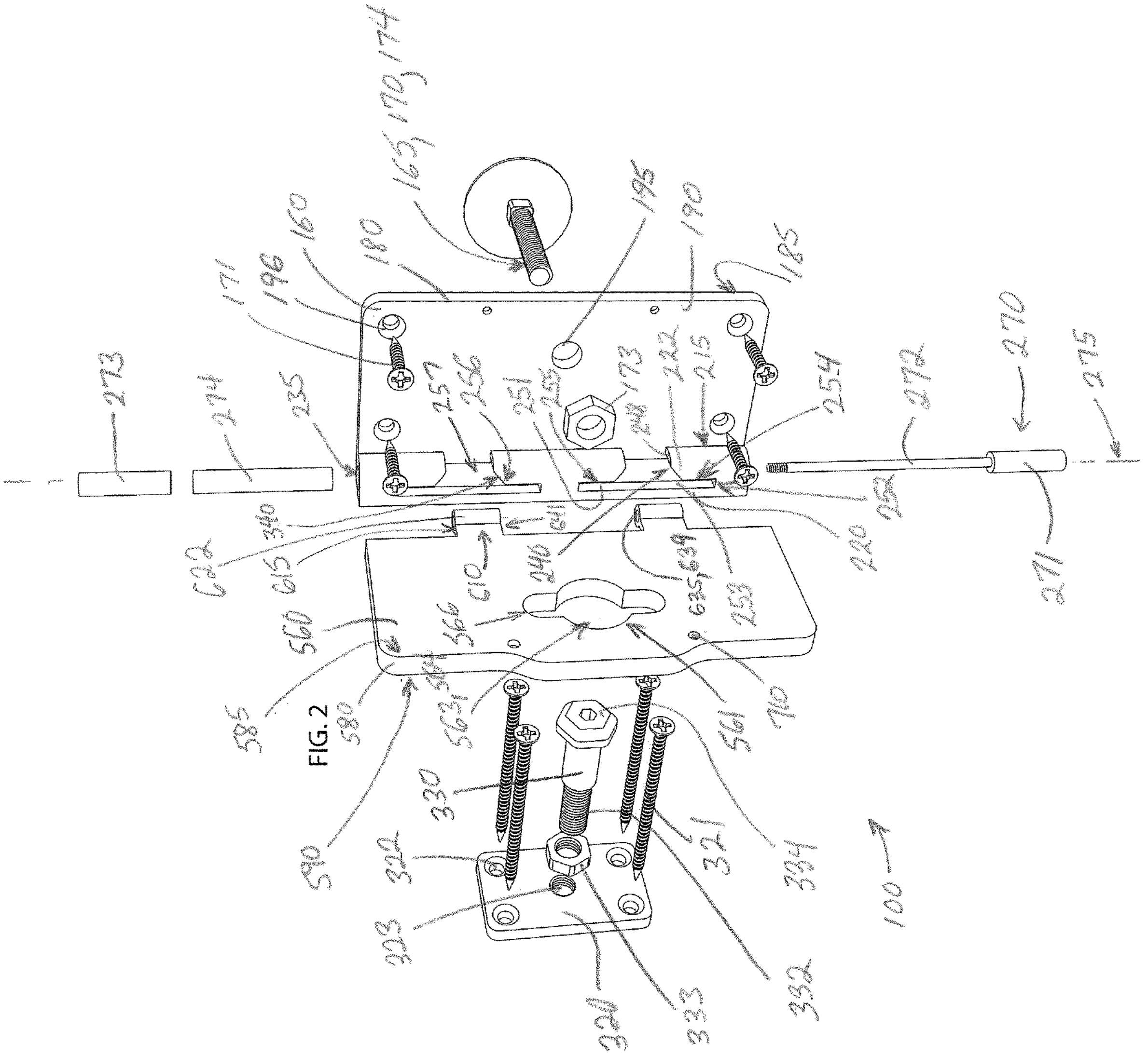
FIG. 2 is an exploded view of the door locking device shown in FIG. 1.
Figure 3:
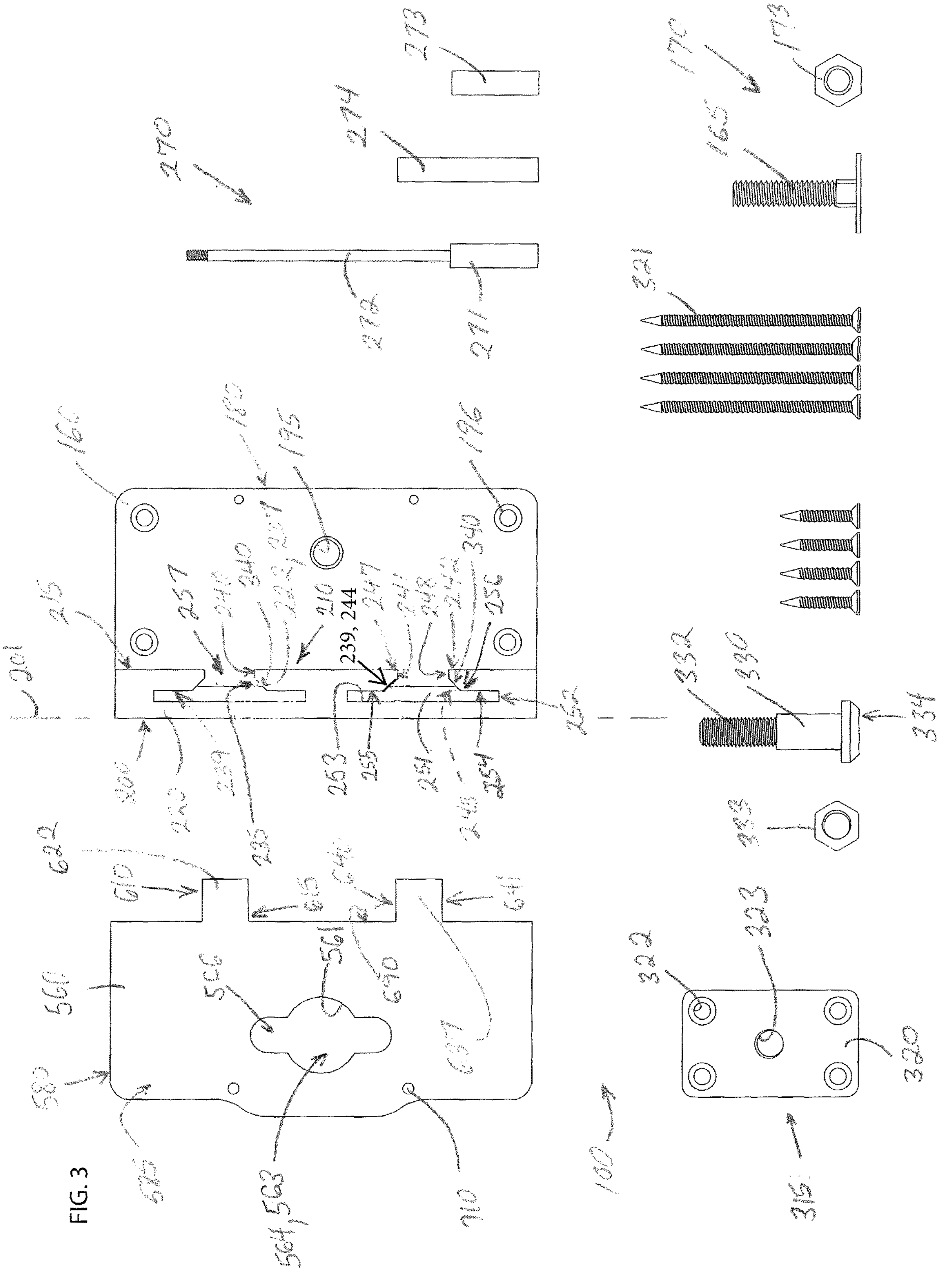
FIG. 3 is a parts view of the door locking device shown in FIG. 2.

As shown in FIGS. 1, 2 and 3 the first receiver wall top surface 240 may include a major rest 248 proximate the first front surface 190 of the first major body 180 of mounting plate 160. The major rest 248 may have a major rest height that defines maximum height of the first receiver wall 222 to support the clasp swing plate 560 at uppermost position thereof in relation to mounting plate 160. The major rest 248 at a second receiver wall bottom surface 641 of clasp swing plate 560 may provide supporting engagement with second receiver ears 610 at uppermost position of same, and thus may support clasp swing plate 560 at uppermost position thereof, when clasp swing plate 560 is pivoted to unlocked position and aligned in abutting relationship at substantially zero degrees (0°) in relation to said mounting plate 160.

As shown in FIGS. 1, 2 and 3 the first receiver wall top surface 240 may include an elongated vertical first locking channel 251 defined in first receiver wall 222 proximate hinge pin vertical axis 275 at substantially ninety degrees (90°) in relation to mounting plate 160. The first locking channel 251 may interrupt the first receiver wall 222, to form an empty, open gap in the first receiver wall 222. The first locking channel 251 may be sized to receive therein a first proximal portion 615 or neck of corresponding second receiver wall 622 of second receiver ear 610 in lowermost position (shown in FIG. 1) thereof, when clasp swing plate 560 in corresponding lowermost position is rotated about hinge pin vertical axis 275 to locked position in perpendicular relationship at substantially ninety degrees (90°) in relation to mounting plate 160. The first locking channel 251 at first locking channel bottom wall 252 defining minimum height thereof may provide supporting engagement with second receiver wall bottom surface 641 of second receiver ear 610 at lowermost position (shown in FIG. 1) of same, and thus may support clasp swing plate 560 at lowermost position (shown in FIG. 1) in relation to mounting plate 160, when clasp swing plate 560 is pivoted to locked position (shown in FIG. 1) and aligned in securing relationship with door frame anchor bolt 320, in perpendicular relationship at substantially ninety degrees (90°) in relation to mounting plate 160.

Figure 10:
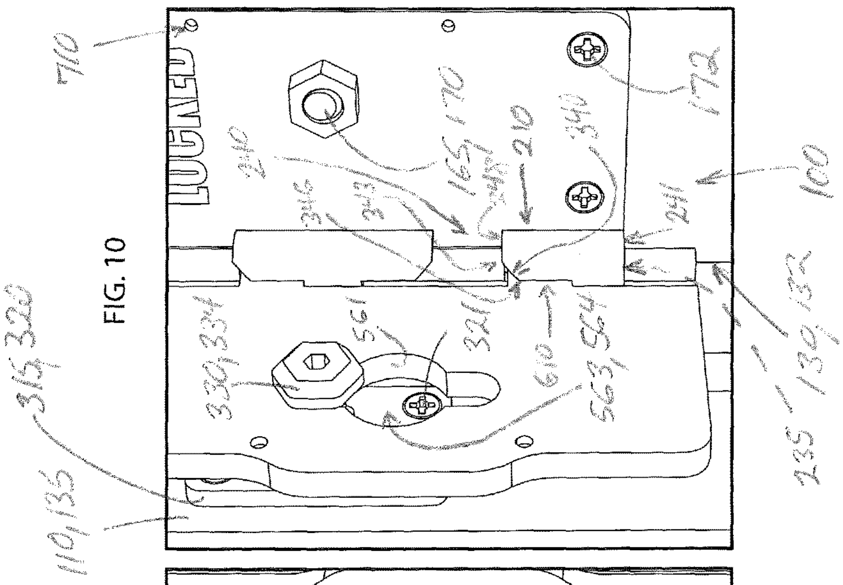
Figure 9:
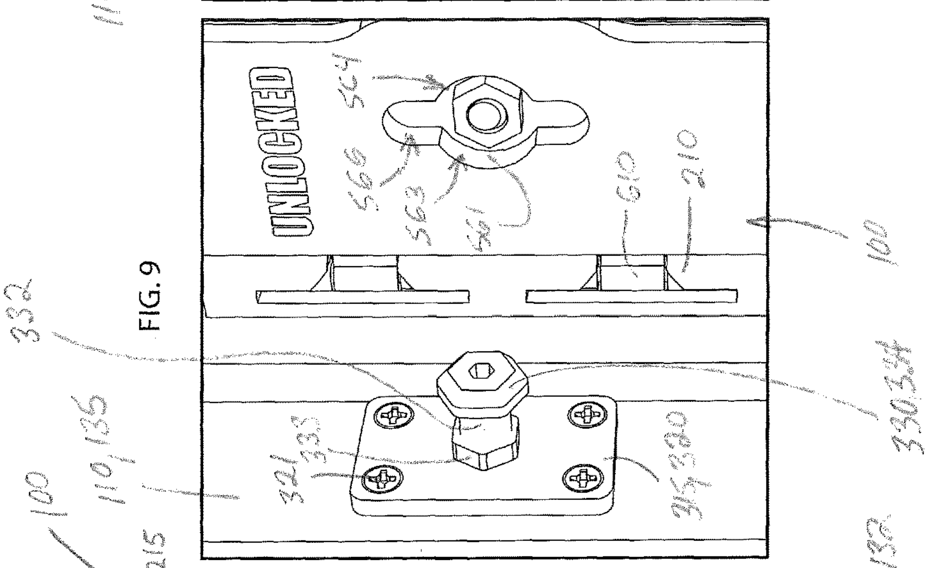
Figure 8:
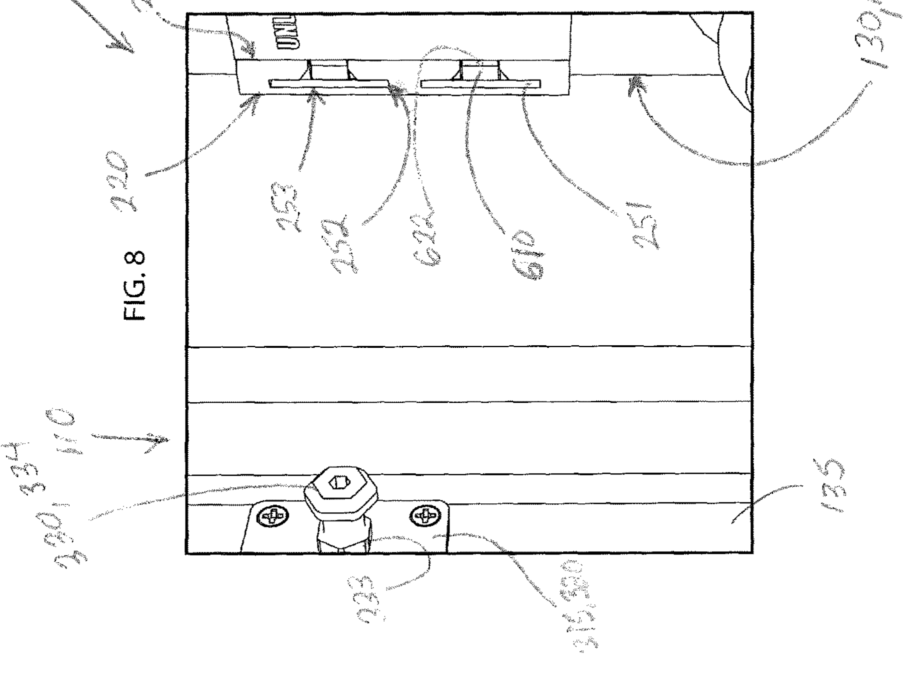
Figure 13:
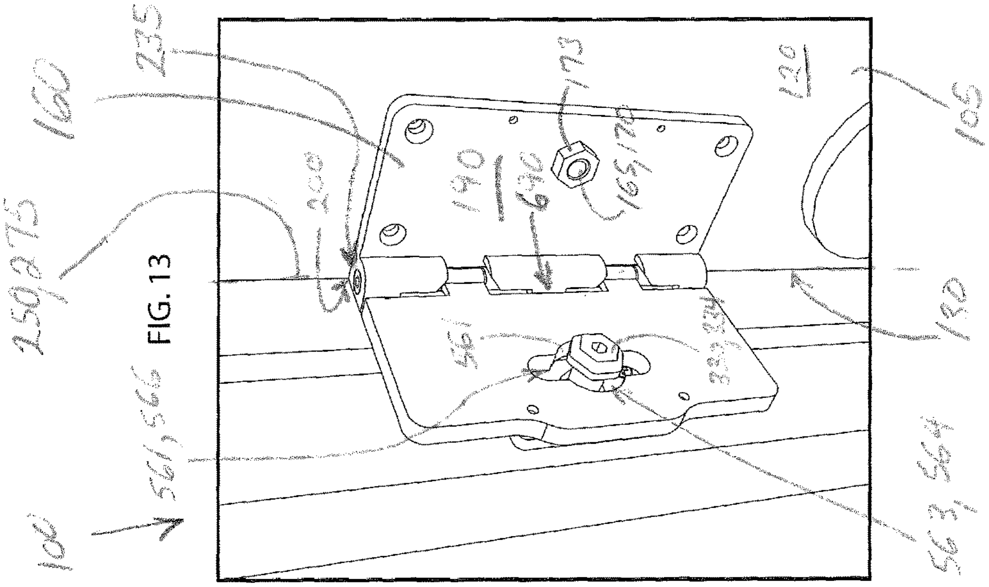
Figure 12:
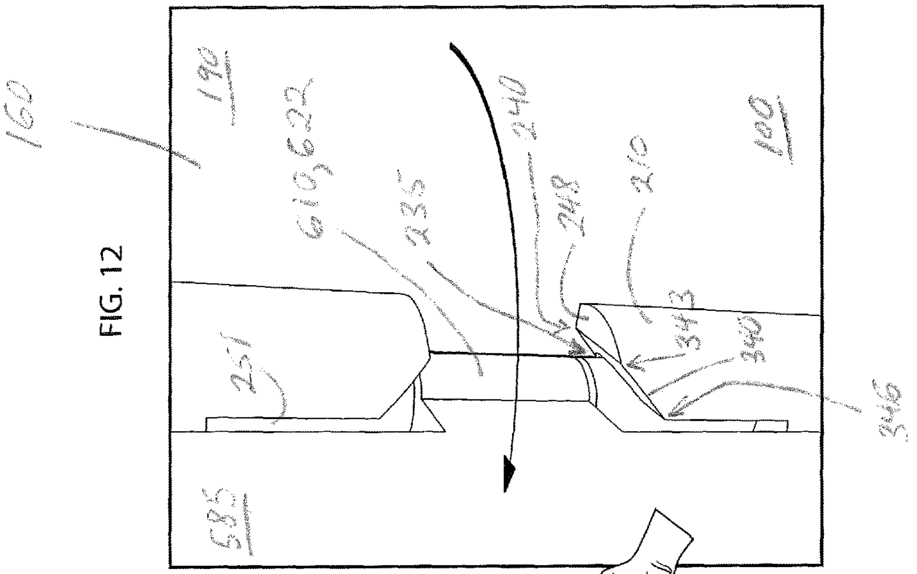
Figure 11:
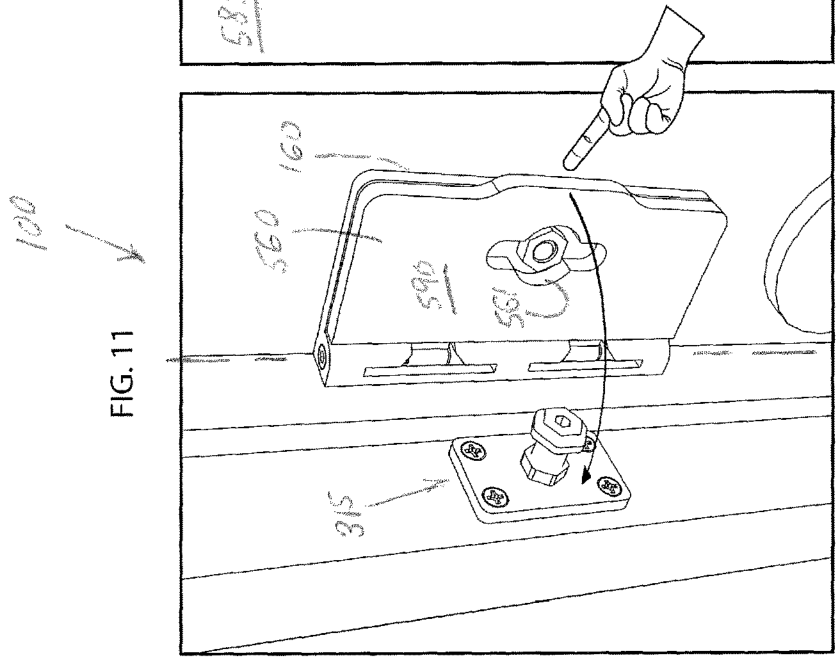
Figure 16:
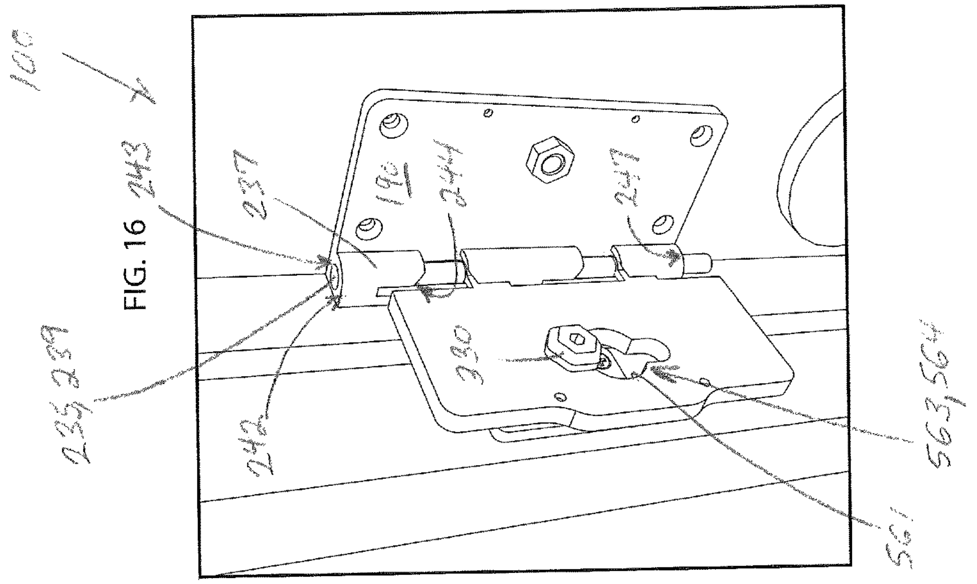
Figure 15:
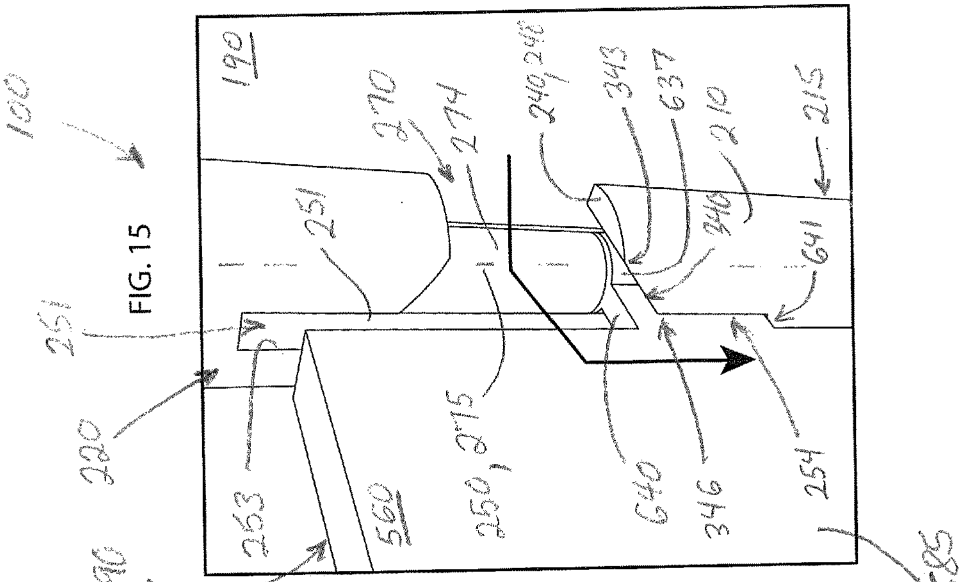
Figure 14:
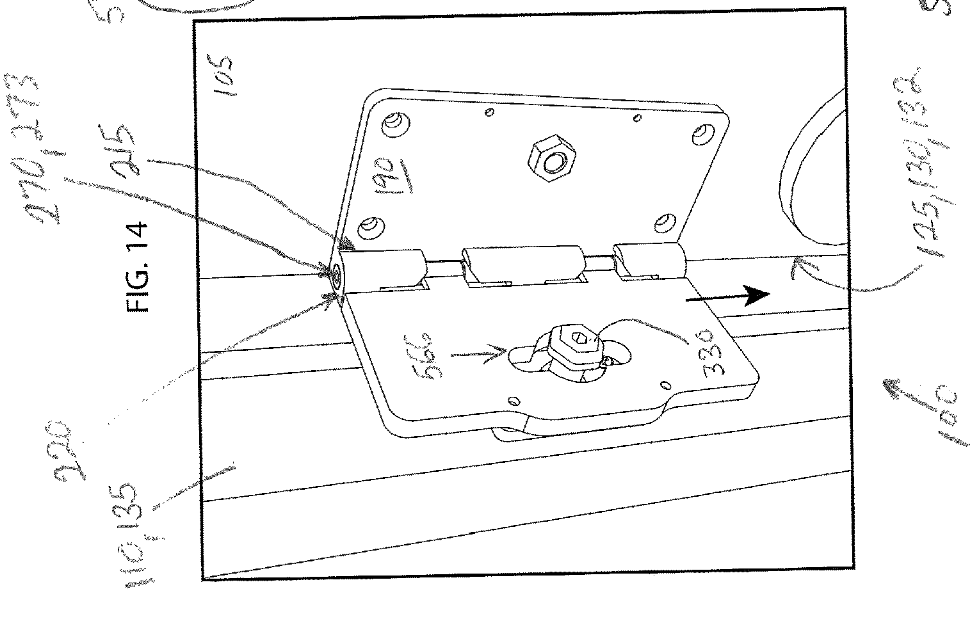
Figure 19:
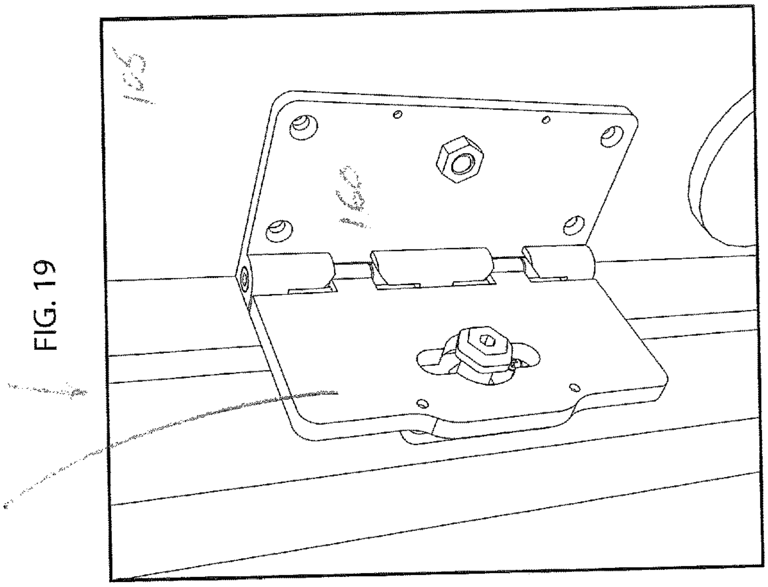
Figure 18:
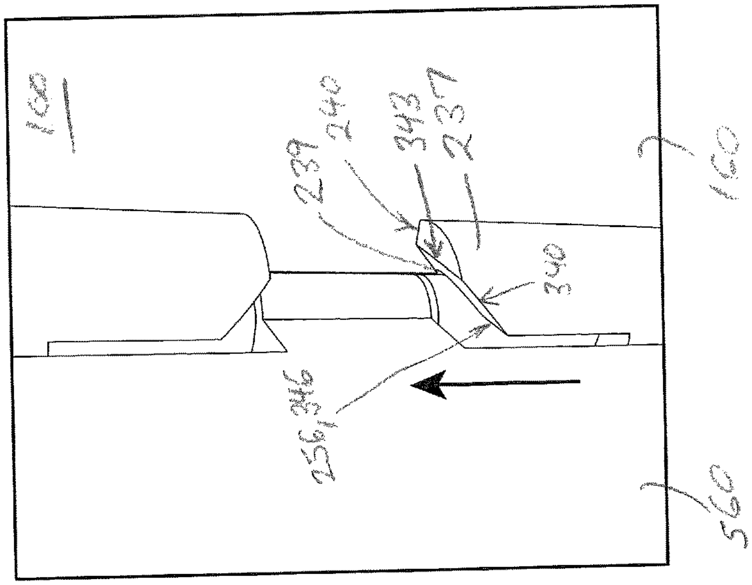
Figure 17:
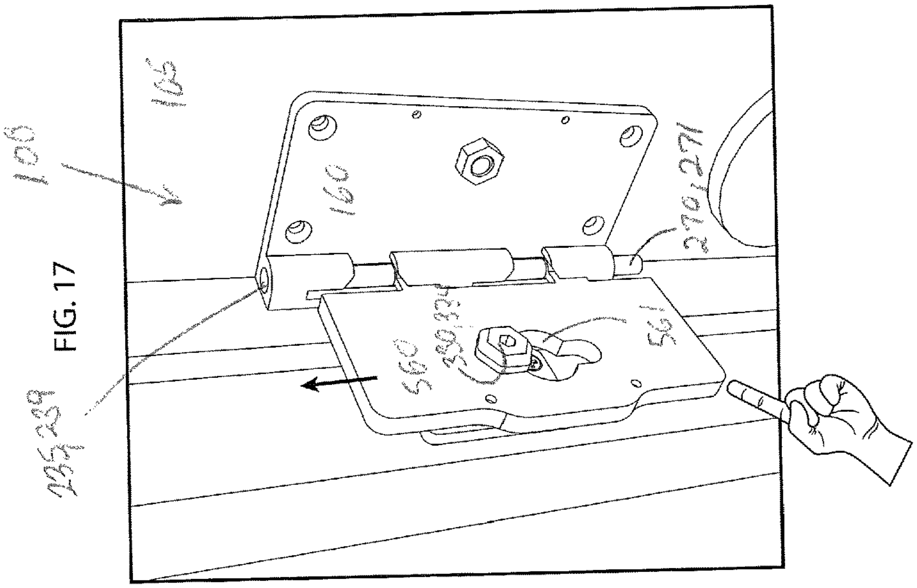
Figure 22:
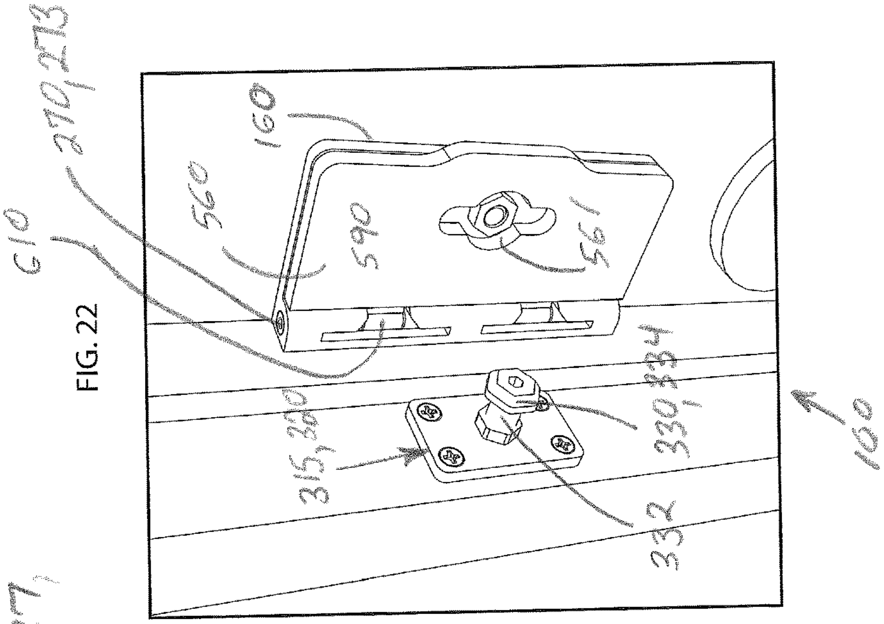
Figure 21:
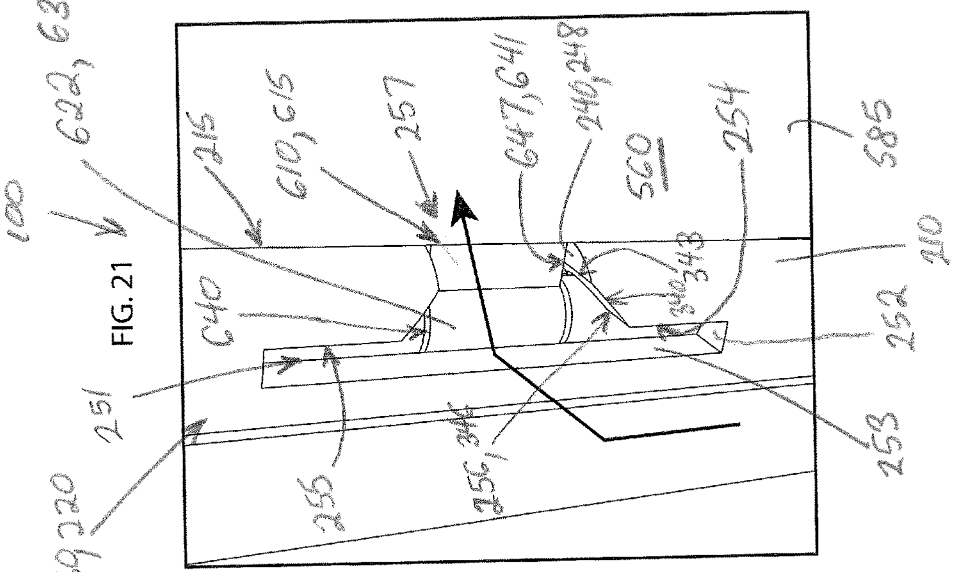
Figure 20:
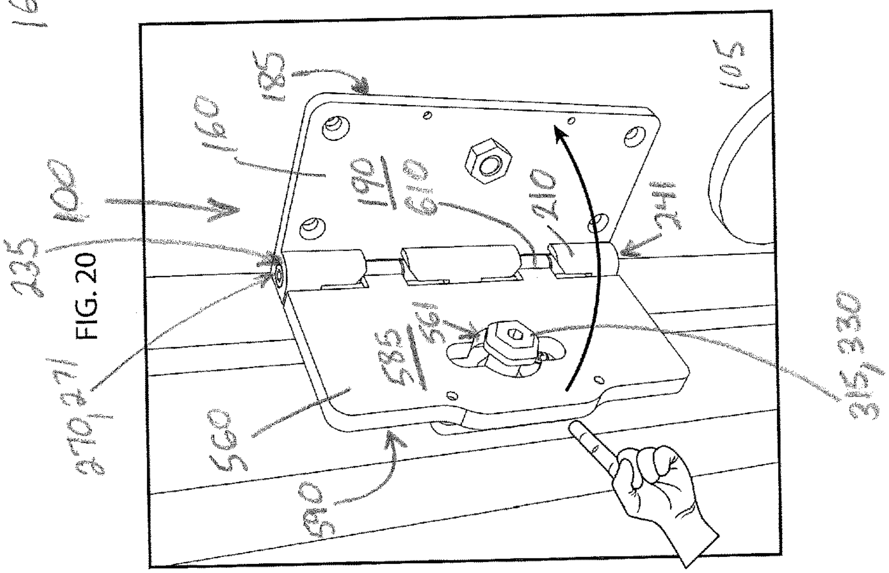

As shown in FIG. 10, the first receiver wall top surface 240 may include an elongated declined slide surface 340 extending from first transition 343 at first major rest 248 at maximum height of first receiver wall top surface 240 downward to second transition 346 at second transition height of first receiver wall top surface 240, where the second transition height is determined to enable corresponding second receiver ear 610, by force of gravity on second receiver ear 610, to pass downward from the upper end of declined slide surface 340 at first transition 343 and across declined slide surface 340 to clear second transition 346, and then to drop in first locking channel 251 to rest on first locking channel bottom wall 252 thereof when clasp swing plate 560 pivots through a range of travel which is about ninety degrees (900) about hinge pin vertical axis 275, from unlocked position in the uppermost position in abutment at substantially zero degrees (0°) in relation to mounting plate 160, to locked position in the lowermost position perpendicular at at substantially ninety degrees (90°) in relation to mounting plate 160. The first declining slide surface 340 at the first lower second transition 346 may introduce the second proximal portion 615 or neck of the second receiver ear 610 into the vertical first locking channel 251. Referring to FIG. 3, the first locking channel 251 may interrupt the first receiver wall 222, to form an empty, open gap in the first receiver wall 222. The first locking channel 251 may be sized to receive therein a first proximal portion 615 or neck of corresponding second receiver wall 622 of second receiver ear 610 in lowermost position thereof, when clasp swing plate 560 in corresponding lowermost position is rotated about hinge pin vertical axis 250 to locked position in perpendicular relationship at substantially ninety degrees (90°) in relation to mounting plate 160. The first locking channel 251 by cooperation of first locking channel major wall 253, opposed first locking channel upper minor wall 255 and lower minor wall 254, and locking channel bottom wall 252, engage the second receiver ear 610 to secure the clasp swing plate 560 in locked position, substantially perpendicular to mounting plate 160, in lowermost position in relation to mounting plate 160. Force of gravity biases the second receiver ear 610 and clasp swing plate 560 to move into, and to be retained, the lowermost position when clasp swing plate 560 is pivoted to locked position and aligned in perpendicular relationship at substantially ninety degrees (90°) in relation to the mounting plate 160.

As shown in FIG. 1, door locking device 100 may include a door frame anchor assembly 315 configured to be mounted to the second jamb 135 of doorframe 110. The door frame anchor assembly 315 may include a door frame anchor mounting plate 320 configured to be secured to the second jamb 135 to support a door frame anchor bolt 330. Door frame anchor mounting plate 320 may include a spaced plurality of minor mounting apertures 325 configured to receive corresponding threaded screws 335 to fix the door frame mounting plate 320 against the second jamb 135. Door frame anchor mounting plate 320 may include a primary aperture 340 having female threads and configured for mating threaded engagement with a door frame anchor bolt 330 having male threads 333 for such mating threaded engagement. The door frame anchor bolt 330 includes an enlarged anchor bolt head 334 and adjoined bolt stem 332 having male threads. The door frame anchor assembly 315 includes an anchor bolt setting nut 333 for setting length of door frame anchor bolt 330 in relation to major anchor aperture 323 having female threads defined in door frame anchor plate 320 for receiving the door frame anchor bolt 330 in mating threaded engagement therewith.

Referring to FIG. 1, enlarged anchor bolt head 345 has a cross-sectional size greater than adjoining anchor bolt stem 346 cross-sectional size. The anchor bolt head 345 is located at a clasp cut-out height determined for the anchor bolt head 345 to be received in a clasp cutout 561 of the clasp swing plate 560. The anchor bolt head 345 is located at a clasp cut-out horizontal offset distance, in relation to the hinge pin vertical axis 250, determined for the anchor bolt head 345 to be received in the clasp cutout 561 of the clasp swing plate 560.

Referring to FIG. 1, the clasp swing plate 560 is configured for releasable secured engagement with the door frame anchor assembly 315. Referring to FIG. 1, the clasp swing plate 560 includes second major body 580 including second front surface 590 disposed in opposition to second rear surface 585. Clasp swing plate 560 may include a plurality of second receiving ears 610 similar to first receiving ears 210, except having a respective second receiver wall top surface 240 that is flat and has uniform height. Clasp swing plate 560 may include a plurality of second receiving bays 690 similar to first receiving bays 290, except having a respective second receiver bay top surface and bottom surface that are flat and have uniform height. Clasp cut-out 561 extends through second major body 580 between second front surface 590 and second rear surface 585 to define clasp cut-out aperture 563 having lower major region 564 in open communication with upper minor region 566. The clasp swing plate 560 is configured for vertical translation movement in relation to the door frame anchor bolt 320. The clasp swing plate 560 may move between an unlocked, uppermost position (shown in FIGS. 5, 6, 8, 9, 11, 22, 29, 30, 33 and 36) pivoted substantially parallel at substantially zero degrees (0°) in relation to the mounting plate 160 where a first major rest 248 of a first receiver ear 210 supports the clasp swing plate 560 in the uppermost position relative to a hinge pin vertical axis 250 and mounting plate 160; and a locked, lowermost position (shown in FIGS. 1, 7, 10, 16, 17, 27, 28, 35 and 38) pivoted substantially perpendicular at substantially ninety degrees (90°) in relation to the mounting plate 160 where a first locking channel bottom wall 252 supports the clasp swing plate 560 in the lowermost position relative to 355 the hinge pin vertical axis 250 and mounting plate 160. The clasp swing plate 560, when pivoted about the hinge pin vertical axis 250 to substantially perpendicular at substantially ninety degrees (90°) in relation to the mounting plate 160, which positions the clasp swing plate 560 substantially perpendicular to the door frame anchor bolt 330 to be secured in anchoring engagement with the door frame anchor bolt 330, is biased by force of gravity to move to the lowermost position to receive only the anchor bolt stem 332 in an upper minor region 566 of an anchor bolt aperture 563 defined by a clasp cut-out 561, and to be positively retained in the lowermost position by force of gravity until manually raised by a user to the uppermost position. The clasp swing plate 560, remaining in the same position pivoted at substantially ninety degrees (900) in relation to the mounting plate 160 and thus positioned substantially perpendicular to the door frame anchor bolt 330 to be secured in anchoring engagement with the door frame anchor bolt 330, may be connected to the door frame anchor bolt 330, or removed from connection to the same, by a user manually raising the clasp swing plate 560 from the lowermost position to the uppermost position that aligns a lower major region 566 of the anchor bolt aperture 563 defined by the clasp cut-out 561 with the door frame anchor bolt 330 to enable the clasp cut-out 561 to clearing and receive, or clear and be removed from, the enlarged anchor bolt head 334.

The clasp cut-out 561 defines a clasp anchor bolt aperture 563 having a lower major region 564 adjoining an upper minor region 566 in open communication. The lower major region 564 is configured to clear and receive the enlarged anchor bolt head 334 of door frame anchor bolt 330 when the clasp swing plate 560 occupies the uppermost position relative to the door frame anchor assembly 315. The upper minor region 566 is configured to receive only the anchor bolt stem 332 of door frame anchor bolt 330, without clearing the enlarged anchor bolt head 334, when the clasp swing plate 560 occupies the lowermost position relative to the door frame anchor assembly 315 and mounting plate 160. The clasp cut-out 561 is located at the clasp cut-out horizontal offset distance determined for the clasp cut-out 561 at the uppermost position to clear and receive the enlarged anchor bolt head 334, and for the clasp cut-out 561 at the lowermost position to receive the anchor bolt stem 332 without clearing the enlarged anchor bolt head 334. The clasp swing plate 560 is biased by force of gravity for vertical translation movement to the lowermost position from the uppermost position when extending toward the anchor bolt at substantially ninety degrees (90°) in relation to the mounting plate 160. The clasp swing plate 560 is retained in the lowermost position by the gravity biasing force to lock the clasp swing plate 560 in locking, anchored relationship with the door frame anchor bolt 330. The clasp anchor bolt aperture 563 defined by clasp cut-out 561 at the upper minor region may receive only the anchor bolt stem 332 in registration relationship when captured behind the enlarged anchor bolt head 334. The clasp swing plate 560 may be disconnected and removed from the position captured behind the enlarged anchor bolt head 334 only when manually raised by a user exceeding the positive biasing force of gravity that positively retains the clasp swing plate in the lowermost position, captured behind the enlarged anchor bolt head 334.

Shown in FIGS. 39-57 is a door locking device 700 in an embodiment. Door locking device is identical to door locking device 100 shown in FIGS. 1-38, except as otherwise illustrated in FIGS. 39-57 or understood by one of ordinary skill in the art.

Apparatus, methods and systems according to embodiments of the disclosure are described. Although specific embodiments are illustrated and described herein, it will be appreciated by those of ordinary skill in the art that any arrangement which is calculated to achieve the same purposes can be substituted for the specific embodiments shown. This application is intended to cover any adaptations or variations of the embodiments and disclosure. For example, although described in terminology and terms common to the field of art, exemplary embodiments, systems, methods and apparatus described herein, one of ordinary skill in the art will appreciate that implementations can be made for other fields of art, systems, apparatus or methods that provide the required functions. The invention should therefore not be limited by the above-described embodiments, methods, and examples, but by all embodiments and methods within the scope and spirit of the invention.

In particular, one of ordinary skill in the art will readily appreciate that the names of the methods and apparatus are not intended to limit embodiments or the disclosure. Furthermore, additional methods, steps, and apparatus can be added to the components, functions can be rearranged among the components, and new components to correspond to future enhancements and physical devices used in embodiments can be introduced without departing from the scope of embodiments and the disclosure. One of skill in the art will readily recognize that embodiments are applicable to future systems, future apparatus, future methods, and different materials.

All methods described herein can be performed in a suitable order unless otherwise indicated herein or otherwise clearly contradicted by context. The use of any and all examples, or exemplary language (e.g., "such as"), is intended merely to better illustrate the disclosure and does not pose a limitation on the scope of the disclosure unless otherwise claimed. No language in the specification should be construed as indicating any non-claimed element as essential to the practice of the disclosure as used herein. Terminology used in the present disclosure is intended to include 420 all environments and alternate technologies that provide the same functionality described herein.

What is claimed is:

1. A door locking system configured to secure an out-swing door against forced entry when installed on the out-swing door and door frame, the door frame including an elongated vertical inside door jamb the door opposite and apart from a vertical outside door jamb, the door having a planar door exterior major surface disposed in spaced opposed relationship to a planar door interior major surface, the door having an elongated vertical door inside edge, the door inside edge bridging in perpendicular intersecting relationship from the door exterior major surface to the door interior major surface, the door supported on a set of door hinges proximate the door inside edge for swinging movement about an out-swing door hinge vertical axis, the door having an elongated vertical door outside edge opposite the door inside edge in parallel relationship therewith, the door outside edge intersecting the door interior major surface along a vertical door outside interior axis, the intersection of the door outside edge with the door interior major surface defining a door outside interior corner, said system comprising:

a mounting plate to be installed in fixed position on the door, the mounting plate configured to be secured against the door interior major surface by an elongated threaded fastener extending through the door;

an elongated hinge pin assembly to be supported by the mounting plate;

said mounting plate configured to support the elongated hinge pin assembly proximate the door outside interior corner when installed, said hinge pin assembly having a hinge pin vertical axis proximate the door outside interior axis in parallel relationship therewith, said hinge pin assembly supported for rotation movement relative to said mounting plate about said hinge pin vertical axis, said hinge pin assembly supported for vertical translation movement relative to said mounting plate along said hinge pin vertical axis between a hinge pin uppermost position and a hinge pin lowermost position;

a door frame anchor assembly configured to be mounted to the door frame second jamb, said door frame anchor assembly comprising a door frame anchor mounting plate configured to be secured to the door frame second jamb, said door frame anchor assembly comprising a door frame anchor bolt configured to be secured to the door frame anchor mounting plate in mating threaded engagement therewith;

a door frame anchor assembly when installed on the door frame second jamb configured for said door frame anchor bolt in fixed position to align with a clasp cut-out of a clasp swing plate;

said clasp swing plate supported on said hinge pin assembly for pivoting movement relative to said mounting plate about said hinge pin vertical axis through a limited range of motion between an unlocked position extending substantially parallel to a first interior surface of said mounting plate and a locked position extending substantially perpendicular to said mounting plate, the clasp swing plate configured to engage the door frame anchor bolt;

said door frame anchor bolt spaced apart from said hinge pin vertical axis, said door frame anchor bolt having an anchor bolt primary axis extending in the horizontal direction in alignment with the clasp cut-out to positively retain the clasp swing plate in the locked position;

said clasp swing plate comprising the clasp cut-out, said clasp cut-out defining a clasp anchor bolt aperture in said clasp swing plate, said clasp cut-out having a lower major region in open communication with an upper minor region above said lower major region, said clasp cut-out configured to clear and receive in said lower major region an enlarged anchor bolt head when said clasp swing plate is raised along said hinge pin vertical axis to a clasp uppermost position relative to said mounting plate, when said clasp is lowered along said hinge pin vertical axis to a clasp lowermost position relative to said mounting plate said clasp cut-out configured to receive in said upper minor region only an anchor bolt stem smaller than said enlarged anchor bolt head, said anchor bolt stem extending to a mounting bolt anchor plate from said enlarged anchor bolt head, said clasp swing plate biased by force of gravity to move downward from said clasp uppermost position to said clasp lowermost position when said clasp swing plate proximate said hinge pin vertical axis is received in a vertical locking channel defined in said mounting plate proximate said hinge pin vertical axis, said vertical locking channel preventing pivoting movement of the clasp swing plate away from the locked position at said hinge pin vertical axis, said enlarged anchor bolt head preventing pivoting movement of the clasp swing plate in said lowermost position away from the locked position at said clasp cut-out upper minor region, said clasp swing plate positively retained in said lowermost position by biasing force of gravity.

2. The door locking system of claim 1, said system further comprising:

said threaded fastener comprising a bolt and nut combination to be installed in the door, when installed the bolt extending through an aperture in the door.

3. The door locking system of claim 1, said system further comprising:

said hinge pin assembly comprising an elongated hinge pin.

4. The door locking system of claim 3, said system further comprising:

said hinge pin assembly comprising said hinge pin having a hinge pin head adjoined to an elongated hinge pin shank having a male threaded end opposite said hinge pin head, said hinge pin assembly comprising a hinge pin end cap having female threads configured for mating threaded engagement with said male threaded end.

5. The door locking system of claim 4, said system further comprising:

said hinge pin assembly comprising a plurality of hinge pin spacers each comprising an elongated cylindrical body configured to receive said hinge pin shank extending therethrough.

6. The door locking system of claim 5, said system further comprising:

said plurality of said hinge pin spacers each having a spacer length relative to said hinge pin vertical axis, said spacer length determined to enable longitudinal translation movement of said second receiver between said uppermost position and said lowermost position.

7. The door locking system of claim 5, said system further comprising:

said hinge pin spacer comprising said elongated cylindrical body configured to be received in a first receiver aperture for movement relative to a first receiver.

8. The door locking system of claim 1, said system further comprising:

said mounting plate comprising a first outside edge having a vertical axis proximate the door outside edge when installed, said mounting plate comprising a set of first receiver ears proximate said first outside edge, said set of first receiver ears spaced apart along a hinge pin vertical axis, said hinge pin vertical axis spaced from said first outside edge;

said mounting plate comprising a set of first receiver bays spaced apart along said hinge pin vertical axis adjacent said set of first receiver ears in alternating relationship therewith, each of said first receiver bays defined between two adjacent receiver ears including an upper receiver ear immediately above and a lower receiver ear immediately below said first receiver bay defined therebetween;

said set of first receiver bays configured to receive in mating relationship a corresponding set of second receiver ears of an adjacent clasp swing plate, said set of second receiver ears docking in said set of first receiver bays in registration relationship therewith;

said first receiver ears extending from said mounting plate major body in integral fixed relationship therewith, each of said first receiver ears comprising a proximal portion adjoining said mounting plate major body and a distal portion spaced from said proximal portion thereof, each of said first receiver ears comprising a first receiver wall extension to said distal portion from said proximal portion, said first receiver wall comprising a first receiver wall return from said distal portion to said proximal portion, cooperation of said first receiver wall extension with said first receiver wall return defining therebetween a first receiver aperture having a continuous tubular first receiver wall inner surface spaced from a first receiver aperture vertical axis in equidistant relationship at a first receiver wall inner radius, said first receiver wall comprising a continuous first receiver wall outer surface disposed in spaced opposed relationship to said first receiver wall inner surface;

said first receiver wall in the vertical direction extending from a continuous first receiver top surface to a continuous first receiver bottom surface, said first receiver wall terminating at said continuous first receiver top surface, said first receiver top surface extending from said first receiver wall outer surface to said first receiver wall inner surface in perpendicular intersecting relationship therewith, said first receiver top surface intersecting said first receiver wall outer surface at a continuous first top surface outer edge spaced from said first receiver aperture vertical axis in equidistant relationship at a first receiver wall outer radius, said first receiver top surface intersecting said first receiver wall inner surface at a continuous first top surface inner edge spaced from said first receiver aperture vertical axis in equidistant relationship at said first receiver wall inner radius;

said first receiver top surface in a direction perpendicular to said first receiver aperture vertical axis having a first receiver top surface primary width between said first top surface inner edge and said first top surface outer edge which is a difference between said first receiver wall outer radius and said first receiver wall inner radius;

said first receiver bottom surface disposed in spaced opposed relationship to said first receiver top surface, said first receiver wall comprising a uniform width from said first receiver top surface to said first receiver bottom surface, said first receiver bottom surface having a first receiver bottom surface primary width between a first bottom surface inner edge and first bottom surface outer edge which is said difference between said first receiver wall outer radius and said first receiver wall inner radius;

said first receiver top surface comprising a major rest proximate said first inner surface of said mounting plate major body, said major rest having a major rest height defining a maximum height of said first receiver wall;

said first receiver top surface comprising a locking channel bottom wall located at substantially ninety degrees) (90° in relation to said first inner surface of said mounting plate major body, said locking channel bottom wall having a locking channel bottom height defining a minimum height of said first receiver wall;

said first receiver top surface comprising a locking channel lower wall transition located at substantially ninety degrees) (90° in relation to said first inner surface of said mounting plate major body, said locking channel lower wall transition having a lower wall transition height defining a transition height of said first receiver wall;

said first receiver top surface comprising a declining slide surface having an upper end intersecting said major rest at said major rest height, said declining slide surface having a lower end intersecting said locking channel lower wall at said lower wall transition height;

said first receiver wall comprising said locking channel defined therein, said locking channel extending along a locking channel vertical axis, said locking channel comprising a locking channel major vertical wall opposite said locking channel minor lower wall, said declining slide surface and said locking channel minor upper wall, said declining slide surface at said lower wall transition introducing said neck portion of said second receiver into said locking channel defined therebetween, said locking channel comprising an open slot extending through said first receiver wall;

said door frame anchor bolt configured to be secured to the door frame anchor mounting plate in mating threaded engagement therewith, said door frame anchor bolt having an anchor bolt head cross-sectional size greater than an adjoining anchor bolt stem cross-sectional size, said anchor bolt head at a clasp cut-out height determined for said anchor bolt head to be received in said clasp cutout of said clasp swing plate, said anchor bolt head at a clasp cut-out horizontal offset distance determined for said anchor bolt head to be received in said clasp cutout of said clasp swing plate;

said clasp swing plate configured for releasable secured engagement with said door frame anchor member, said clasp swing plate configured for vertical translation movement in relation to said door frame anchor member between an uppermost position and lowermost position when extending substantially perpendicular to said anchor bolt at substantially ninety degrees) (90° in relation to said first inner surface of said mounting plate major body, said clasp swing plate comprising said clasp cut-out defining a clasp anchor bolt aperture having a lower major region adjoining an upper minor region in open communication therewith, said lower major region configured to clear and receive said anchor bolt head when said clasp swing plate occupies said uppermost position relative to said door frame anchor assembly, said upper minor region configured to receive said anchor bolt stem without clearing said anchor bolt head when said clasp swing plate occupies said lowermost position relative to said door frame anchor assembly, said clasp cut-out at said clasp cut-out horizontal offset distance determined for said clasp cut-out at said clasp uppermost position to clear and receive said anchor bolt head and for said clasp cut-out at said clasp lowermost position to receive said anchor bolt stem without clearing said anchor bolt head, said clasp swing plate biased by force of gravity for vertical translation movement to said lowermost position from said uppermost position when extending toward said anchor bolt at substantially ninety degrees) (90° in relation to said mounting plate major body, said clasp swing plate retained in said lowermost position by gravity biasing force to lock said clasp swing plate at said anchor bolt with said clasp anchor bolt aperture at said minor upper region receiving said anchor bolt stem in registration relationship behind said enlarged anchor bolt head, unless same is exceeded by force opposing said gravity biasing force to raise said clasp swing plate from said lowermost position to said uppermost position;

said clasp swing plate comprising a first edge proximate said hinge pin vertical axis, said clasp swing plate comprising a second edge opposite said first edge, said second edge having a second vertical axis spaced from said first edge, said clasp swing plate comprising a set of second receiver ears proximate said first edge, said set of second receiver ears spaced apart along said hinge pin vertical axis;

said clasp swing plate comprising a set of second receiver bays spaced apart along said hinge pin vertical axis adjacent said set of second receiver ears in alternating relationship therewith, each of said second receiver bays defined adjacent at least one of said second receiver ears;

said set of second receiver bays configured to receive in mating relationship a corresponding set of first receiver ears of an adjacent mounting plate, said set of first receiver ears docking in said set of second receiver bays in registration relationship therewith;

said second receiver ears extending from said clasp swing plate major body in integral fixed relationship therewith, each of said second receiver ears comprising a neck adjoining said mounting plate major body, each of said second receiver ears comprising a proximal portion adjoining said neck, each of said second receiver ears comprising a distal portion spaced from said proximal portion thereof, each of said second receiver ears comprising a second receiver wall extension to said distal portion from said proximal portion, said second receiver wall comprising a second receiver wall return from said distal portion to said proximal portion, cooperation of said second receiver wall extension with said second receiver wall return defining therebetween a second receiver aperture having a continuous tubular second receiver wall inner surface spaced from a second receiver aperture vertical axis in equidistant relationship at a second receiver wall inner radius, said second receiver wall comprising a continuous second receiver wall outer surface disposed in spaced opposed relationship to said second receiver wall inner surface;

said second receiver wall in the vertical direction extending from a continuous second receiver top surface to a continuous second receiver bottom surface, said second receiver wall terminating at said continuous second receiver top surface, said second receiver top surface extending from said second receiver wall outer surface to said second receiver wall inner surface in perpendicular intersecting relationship therewith, said second receiver top surface intersecting said second receiver wall outer surface at a continuous second top surface outer edge spaced from said second receiver aperture vertical axis in equidistant relationship at a second receiver wall outer radius, said second receiver top surface intersecting said second receiver wall inner surface at a continuous second top surface inner edge spaced from said second receiver aperture vertical axis in equidistant relationship at said second receiver wall inner radius, said second receiver top surface in a direction perpendicular to said second receiver aperture vertical axis having a second receiver top surface primary width between said second top surface inner edge and said second top surface outer edge which is a difference between said second receiver wall outer radius and said second receiver wall inner radius;

said second receiver bottom surface disposed in spaced opposed relationship to said second receiver top surface, said second receiver wall comprising a uniform width from said second receiver top surface to said second receiver bottom surface, said second receiver bottom surface having a second receiver bottom surface primary width between a second bottom surface inner edge and second bottom surface outer edge which is said difference between said second receiver wall outer radius and said second receiver wall inner radius;

said second receiver top surface having a uniform maximum height of said second receiver wall;

said second receiver bottom surface having a uniform base height of said second receiver wall;

said second receiver height established by height of said first receiver top surface in supporting engagement with said uniform second receiver bottom surface in said neck portion of said second receiver, said height of said first receiver top surface determined by angular rotation position of said clasp swing plate in relation to said hinge pin vertical axis, when said clasp swing plate is turned relative to said hinge pin vertical axis to an unlocked position extending substantially parallel to said mounting plate, said second receiver is supported at said maximum height by supporting engagement with said major rest to raise said clasp swing plate to said uppermost position;

when said clasp swing plate is turned relative to said hinge pin vertical axis to an unlocked position in an angular zone ranging between said mounting plate and said locking channel transition, said second receiver is supported at differential height by supporting engagement with said declining slide surface to lower said clasp swing plate through a range of positions lower than said uppermost position;

when said clasp swing plate is turned relative to said hinge pin vertical axis to a locked position extending substantially perpendicular to said mounting plate toward said door frame anchor bolt, said second receiver is supported at said minimum height by supporting engagement with said locking channel bottom wall to support said clasp swing plate at said lowermost position, said clasp swing plate turned in the angular zone from said locking channel transition to said locking channel bottom wall biased by force of gravity to be retained in said lowermost position by said clasp cut-out upper minor region secured to said anchor bolt stem behind said anchor bolt enlarged head.

* * * * *